United States Patent [19]

Miller

[11] Patent Number: 6,064,438

[45] Date of Patent: *May 16, 2000

[54] VIDEO INDEXING PROTOCOL

[75] Inventor: John David Miller, Beaverton, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/701,038

[22] Filed: Aug. 21, 1996

Related U.S. Application Data

[63] Continuation of application No. 08/328,871, Oct. 24, 1994, abandoned.

[51] Int. Cl.$^7$ .................................................. H04N 7/08
[52] U.S. Cl. ........................ 348/465; 709/219; 345/328
[58] Field of Search ................................ 348/6, 7, 460, 348/461, 473, 474, 906, 12, 13, 463, 465, 467; 370/71, 73, 124; 358/142, 147; 345/327, 328; 709/217–219; H04N 7/08, 7/087

[56] References Cited

U.S. PATENT DOCUMENTS

| | | | |
|---|---|---|---|
| 5,010,499 | 4/1991 | Yee | 348/552 |
| 5,251,209 | 10/1993 | Jurkevich et al. | 370/82 |
| 5,262,860 | 11/1993 | Fitzpatrick et al. | 348/476 |
| 5,283,639 | 2/1994 | Esch et al. | 455/3.1 |
| 5,289,276 | 2/1994 | Siracusa et al. | 348/467 |
| 5,347,304 | 9/1994 | Moura et al. | 348/12 |
| 5,347,315 | 9/1994 | Mary et al. | 348/463 |
| 5,351,129 | 9/1994 | Lai | 348/584 |
| 5,381,413 | 1/1995 | Tobagi et al. | 370/85.6 |
| 5,396,494 | 3/1995 | Roposh | 370/85.2 |
| 5,400,401 | 3/1995 | Wasilewski et al. | 380/9 |
| 5,442,389 | 8/1995 | Blahut et al. | 348/13 |
| 5,481,312 | 1/1996 | Cash et al. | 348/465 |
| 5,481,542 | 1/1996 | Logston et al. | 348/13 |
| 5,488,412 | 1/1996 | Majeti et al. | 348/12 |
| 5,524,001 | 6/1996 | Beaudry et al. | 370/73 |
| 5,537,151 | 7/1996 | Orr et al. | 348/468 |
| 5,557,724 | 9/1996 | Sampat et al. | 395/157 |
| 5,583,562 | 12/1996 | Birch et al. | 348/12 |
| 5,614,940 | 3/1997 | Cobbley et al. | 348/906 |
| 5,682,195 | 10/1997 | Hendricks et al. | 348/6 |
| 5,819,034 | 10/1998 | Joseph et al. | 455/6.2 |

*Primary Examiner*—Victor R. Kostak
*Attorney, Agent, or Firm*—Blakely, Sokoloff, Taylor & Zafman LLP

[57] ABSTRACT

A computer-implemented method and apparatus for transmitting information with a video signal. At least one client application creates a message to be transmitted to a receiver. The client application transmits the message to a data encoder and the encoder receives the message and other messages from other client applications. The encoder transforms the message and the other messages into packets and multiplexes them into a bitstream to be encoded with a video programming signal. The multiplexing is performed according to priorities assigned to the at least one client application and the other client applications. The encoder transmits the bitstream to a video encoder to transmit the bitstream with the video programming signal in order to be received by a decoder. The decoder can then decode the information from the video signal and transmit the information to at least one decoder client application. The client applications may include: a status application which transmits a status information (e.g. time references) at regular intervals; a program application which transmits descriptive information of the video programming synchronized with the video signal (e.g. program markers and/or program text, such as closed-captions and/or subtitles); and a non-program application. The status application may have a highest priority, the program application has a next highest of priority, and the non-programming signal has a lowest priority.

44 Claims, 23 Drawing Sheets

VIDEO INDEXING PROTOCOL

CROSS-REFERENCES TO RELATED APPLICATIONS

This is a continuation of a U.S. patent application (application Ser. No. 08/328,871) filed Oct. 24, 1994, now abandoned.

BACKGROUND OF THE INVENTION

1. Field of the Invention

The present invention relates to video transmission/reception systems. More specifically, the present invention relates to a protocol and apparatus for transmitting information in conjunction with a video signal.

2. Background Information

With the proliferation of personal computer systems and the decline in costs of high-capacity computer technology in general, the technologies of television transmission and computer applications are starting to merge. Solutions have been slow in coming, however.

For certain applications in television program transmission, it is desirable to transmit information in addition to the audio/video portion of the signal. For example, closed-captioned programming is now being used extensively to serve the needs of the hearing-impaired. In fact, recent requirement for television receivers include the requirement that all receivers provide this capability to display, in text, the audio portion of the transmitted program.

For news programming, other needs have arisen. For example, for 24-hour a day news programming, real-time stock quotes and sports scores are now being displayed as part of the video portion of the signal on services such as Headline News (a trademark of Turner Broadcasting, Inc.). Although this serves the needs of the viewer, providing such real-time information, this solution not only distracts the viewer of the video screen, but also unnecessarily consumes screen space, and does not allow the viewer to view the information which is of interest to him. For example, to view the price of a particular stock, the viewer has to wait until the ticker cycles back to display that information. The same deficiency is true for sports scores. Other viewers, such as those requiring real-time weather information needs are also not met. Thus, an improved means for obtaining such information is required.

Prior art solutions such as closed-captioning use the vertical blanking interval (VBI) for encoding text for the audio portion of the programming. It typically uses line 21 of the vertical synchronization portion of the video signal. Thus, although it does not interfere with the transmission of the video signal, it has lacked the capability to be used in any other way, rather than real-time display to the viewer, such as for indexing of the television program, full-text capture of information conveyed by the program, and/or other text processing operations commonly performed in modern personal computer word processing application programs.

Another shortcoming of closed-captioning is that although it uses a portion of the VBI for transmission (line 21), is does not make efficient use of the bandwidth of that portion of the non-displayed video signal. It is estimated that a single line of the VBI can be used for uncompressed data transmission at approximately 14.4 kilobytes/second. Thus, real-time closed captioning of the audio program of a televised broadcast does not take full advantage of the bandwidth of the signal. It also is a unichannel system, wherein only the closed captioning information is transmitted, rather than taking advantage of the full-bandwidth of the signal.

Prior art information which has been transmitted in conjunction with television programming sometimes only transmits limited information about the programming. For example, in consumer satellite television reception systems, usually only text information describing the title of the program, and at most, the time elapsed or time remaining in the program has been transmitted with the programming. More detailed information, such as references to outside sources related to the programming, or other information, which is synchronized with the programming has not been transmitted in conjunction with the signal.

Thus, the prior art for transmitting information with television programming suffers from several shortcomings.

SUMMARY OF THE INVENTION

A computer-implemented method and apparatus for transmitting information with a video signal. At least one client application creates a message to be transmitted to a receiver. The client application transmits the message to a data encoder and the encoder receives the message and other messages from other client applications. The encoder transforms the message and the other messages into packets and multiplexes them into a bitstream to be encoded with a video programming signal. The multiplexing is performed according to priorities assigned to at least one client application and other client applications. Then, the encoder transmits the bitstream to a video encoder to transmit the bitstream with the video programming signal in order to be received by a decoder. The decoder can then decode the information from the video signal and transmit the information to at least one decoder client application. The client applications may include: a status application which transmits a status information (e.g. time references) at regular intervals; a program application which transmits descriptive information of the video programming synchronized with the video signal (e.g. program markers and/or program text, such as closed-captions and/or subtitles); and a non-program application. The status application may have a highest priority, the program application has a next highest of priority, and the non-programming signal has a lowest priority. In this manner, useful, descriptive and other program or non-program-related information may be transmitted along with the video signal, and displayed and processed according to user requirements.

BRIEF DESCRIPTION OF THE DRAWINGS

The present invention is illustrated by way of example and is not limited by the figures of the accompanying in which like references indicate like elements and in which.

DETAILED DESCRIPTION

The present invention is a method and apparatus for transmitting information in conjunction with a video signal. The system to be described here includes the Video Indexing Protocol (VIP). The techniques to be described here can be used to transmit any information in conjunction with a video signal, although, specific information has been described for illustration purposes. Although the present invention will be described with reference to certain specific embodiments, including specific data packets, types of communication media, networking systems, transmission apparatus, etc., it can be appreciated by one skilled in the art that these are for illustrative purposes only and are not to be construed as limiting the present invention. Other departures, modifications, and other changes may be made, by one skilled in the art, without departing from the teaching of the present invention.

Figure 1:
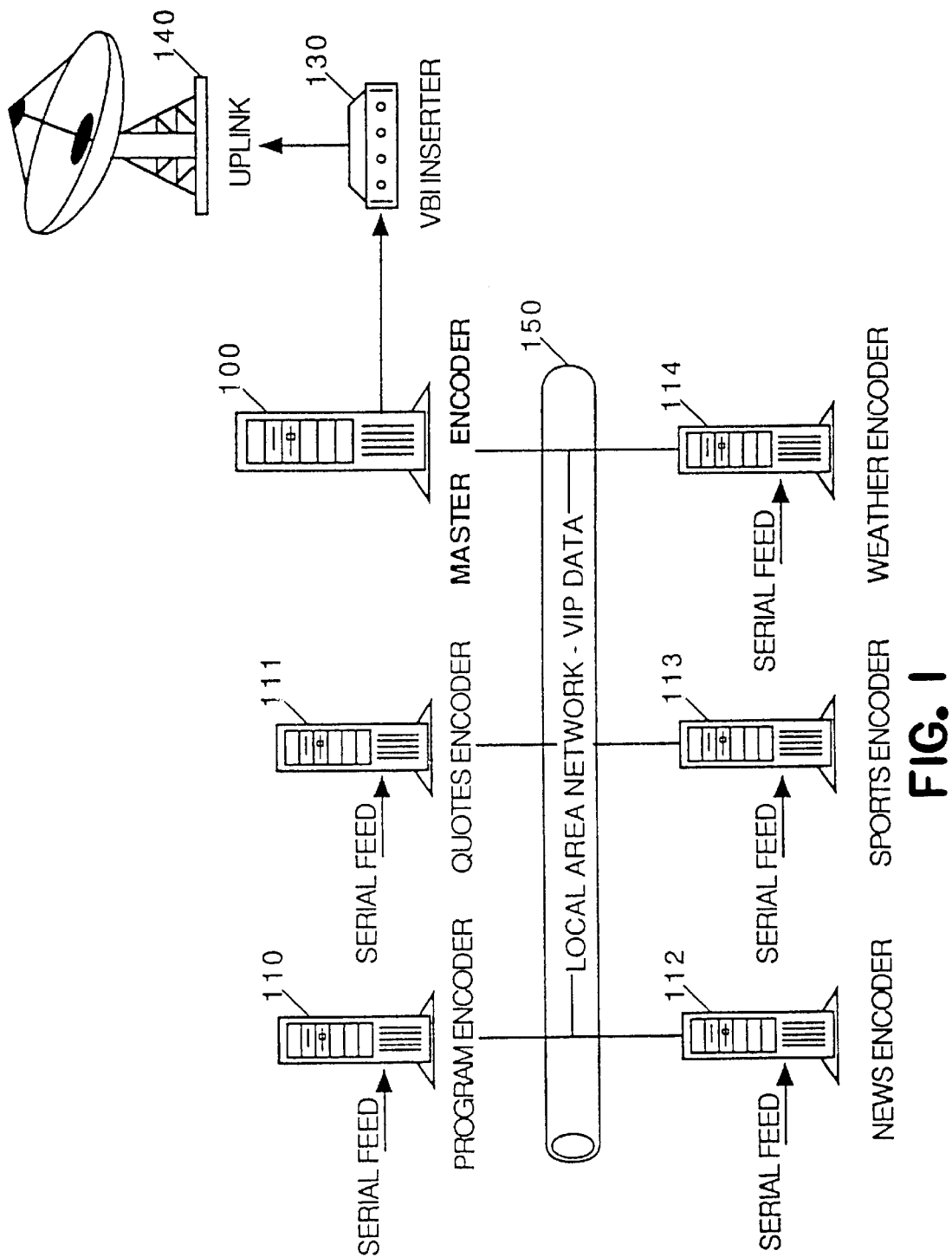
FIG. 1 shows a system in which an encoder can be implemented.
Figure 2:
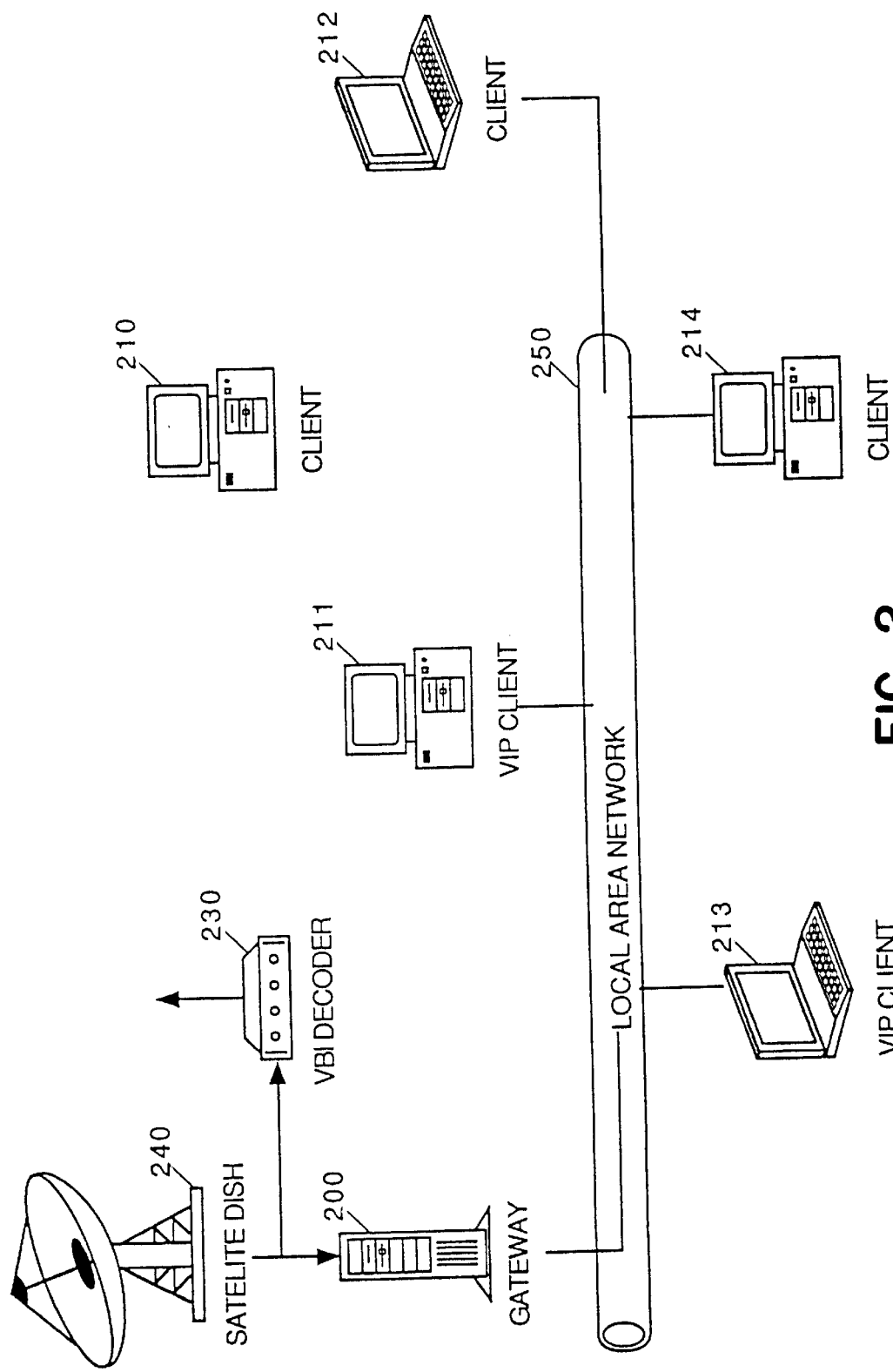
FIG. 2 shows a system in which a decoder can be implemented.

The methods and apparatus used in the implemented embodiments of the present invention comprise an encoder portion and a decoder portion, examples of which are shown in FIGS. 1 and 2. The encoder or "head end" of the video transmission system may have a structure as illustrated in FIG. 1. The system includes a master encoder 100 which may receive encoded messages from a plurality of computer systems 110–114 which communicate with encoder 100 via networking medium 150. Network 150 may be any number of prior art networks, including local area networks (LAN's), such as Ethernet, Token-ring, FDDI, or other networking media as are commercially available. The encoders 110–114 will convert their respective information into messages to be processed by encoder 100, and software, operative within encoder 100, will then packetize and prioritize these messages as packets which are then transmitted to VBI inserter 130.

VBI inserter 130 may be any number of commercially available VBI inserters, such as the model number TDS-3 brand VBI inserter available from Norpak Corporation of Ottawa, Ontario, Canada. Note that for the remainder of this application, VBI insertion into an audio/video program signal (NTSC) will be discussed, however, this is for illustration purposes only, and other audio/video encodings for other formats (e.g. PAL, SECAM), and other broadcasting methods (e.g. digital video). This information may then be transmitted via satellite uplink 140, along with the audio/video program content. The signal may also be broadcast, cablecast or transmitted in other ways, according to implementation, and this invention is not limited to satellite uplinks or downlinks. Each of the encoders 110–114 may have a different encoding function, such as closed-captioned or foreign-language subtitles, stock quotes, news text, sports scores, or weather, with serialized bitstreams feeding those encoders. In addition to this information, status information for the transmission such as timecodes (e.g. SMPTE timecodes, or time reference markers such as GMT), station ID, and channel map. This may include program content information. This may include generic information, such as scene or story markers, and for an application such as a news transmission, the program content information may include text of the news stories. Any other information, real-time or not, may be included within the information which is encoded.

The structure of the decoder is shown in FIG. 2. FIG. 2 essentially performs the reverse of the apparatus shown in FIG. 1. A satellite downlink 240 may receive the encoded audio/video program which is then decoded by a VBI decoder 230 into the separate program and encoded data portions. Then, a master decoder or gateway computer system receives the encoded data, and the different channels of information can be made available to a plurality of client systems 210–214 over a networking medium, for example. For example, each of the computer systems 210–214 may be interested in a separate portion of the bitstream. Thus, those clients may only need to examine a portion, or channel (e.g. program information, stock, sports scores, weather), of the incoming bitstream, according to user requirements. The details of this will be discussed more below.

Although separate systems are shown in FIGS. 1 and 2, it can be appreciated that such is for illustration purposes only, and that in a multitasking environment, a single system (e.g. 100, 200), may be used for encoding wherein any or all of the separate encoders (e.g. 110–114, 210–214) can be implemented as separate processes resident in a single computer. The techniques have equal application to multitasking, multicomputing, or networking environments.

Figure 3:
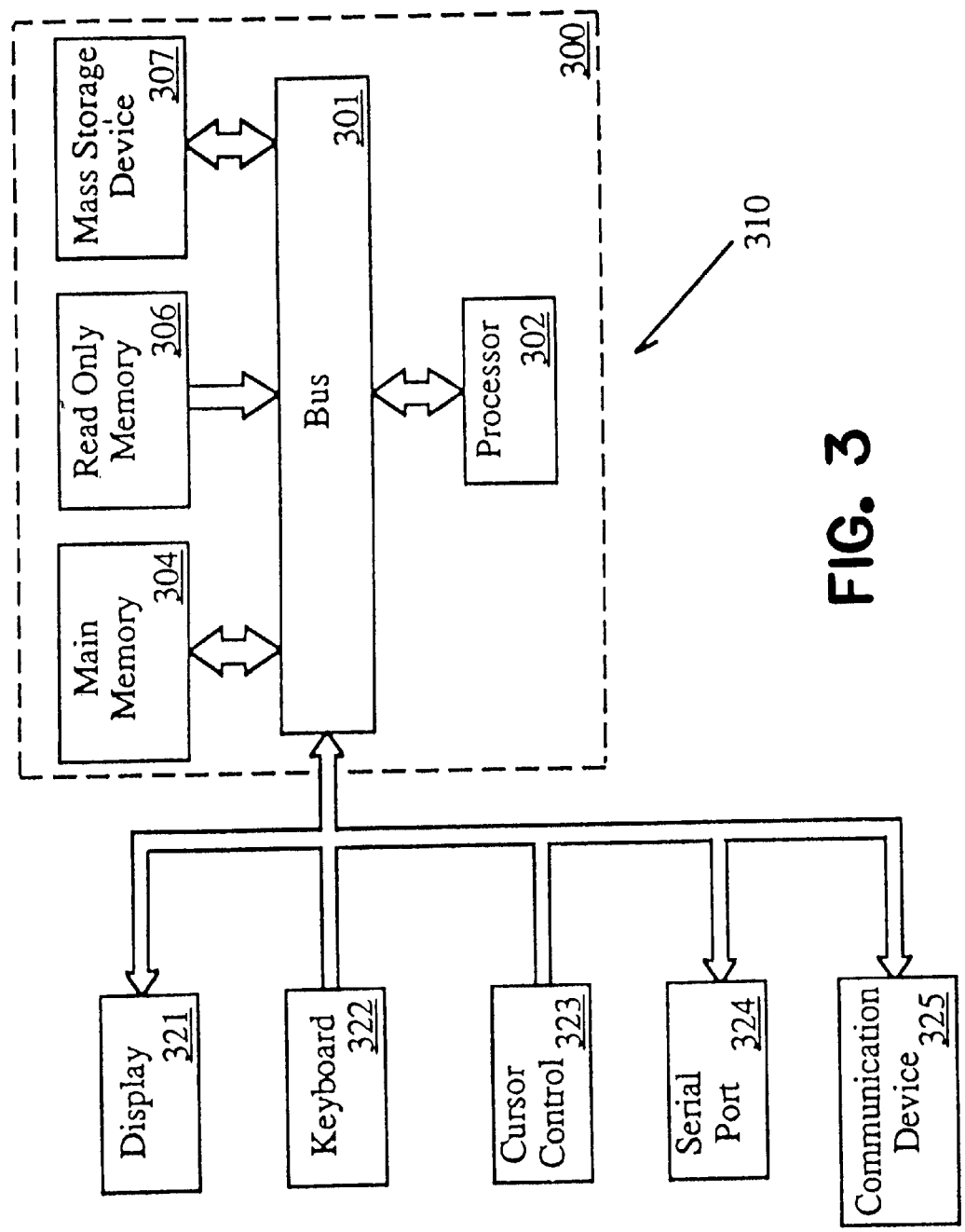
FIG. 3 shows a block diagram of devices in a networking system in which embodiments of present invention may be implemented.

Referring to FIG. 3, a system 310 upon which one embodiment of a computer system (e.g. encoder 100 or decoder 200) of the present invention as implemented is shown. System 310 comprises a bus or other communication means 301 for communicating information, and a processing means 302 coupled with bus 301 for processing information. System 310 further comprises a random access memory (RAM) or other volatile storage device 304 (referred to as main memory), coupled to bus 301 for storing information and instructions to be executed by processor 302. Main memory 304 also may be used for storing temporary variables or other intermediate information during execution of instructions by processor 302. System 310 also comprises a read only memory (ROM) and/or other static storage device 306 coupled to bus 301 for storing static information and instructions for processor 302, and a data storage device 307 such as a magnetic disk or optical disk and its corresponding disk drive. Data storage device 307 is coupled to bus 301 for storing information and instructions.

System 310 may further be coupled to a display device 321, such as a cathode ray tube (CRT) or liquid crystal display (LCD) coupled to bus 301 for displaying information to a computer user. An alphanumeric input device 322, including alphanumeric and other keys, may also be coupled to bus 301 for communicating information and command selections to processor 302. An additional user input device is cursor control 323, such as a mouse, a trackball, stylus, or cursor direction keys, coupled to bus 301 for communicating direction information and command selections to processor 302, and for controlling cursor movement on display 321.

In implemented embodiments, other devices which may be coupled to bus 301 include a serial interface 324 and/or a communication device 325 either of which comprise means for communicating with other devices. This communication device may also include a means for communicating with other nodes in a network. In implemented embodiments, this may include an Ethernet standard interface coupled to a CSMA/CD backplane for communicating information with other computers (e.g. encoders 110–114, or decoders 210–214). Note, also, that any or all of the components of system 310, and associated hardware may be used in various embodiments, however, it can be appreciated that any configuration of the system that includes a processor 302 may be used for various purposes according to the particular implementation.

In one embodiment, system 310 is one of the IBM AT-compatible type personal computers such as the Gateway 2000 brand personal computer manufactured by Gateway Computer Systems. Processor 302 may be one of the Pentium® brand microprocessors available from Intel Corporation of Santa Clara, Calif. (Pentium and Intel are trademarks of Intel Corporation).

Note that the following discussion of various embodiments discussed herein will refer specifically to a series of routines which are generated in a high-level programming language (e.g., the C or C++ language) and compiled, linked, and then run as object code in system 310 during run-time. It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 4:
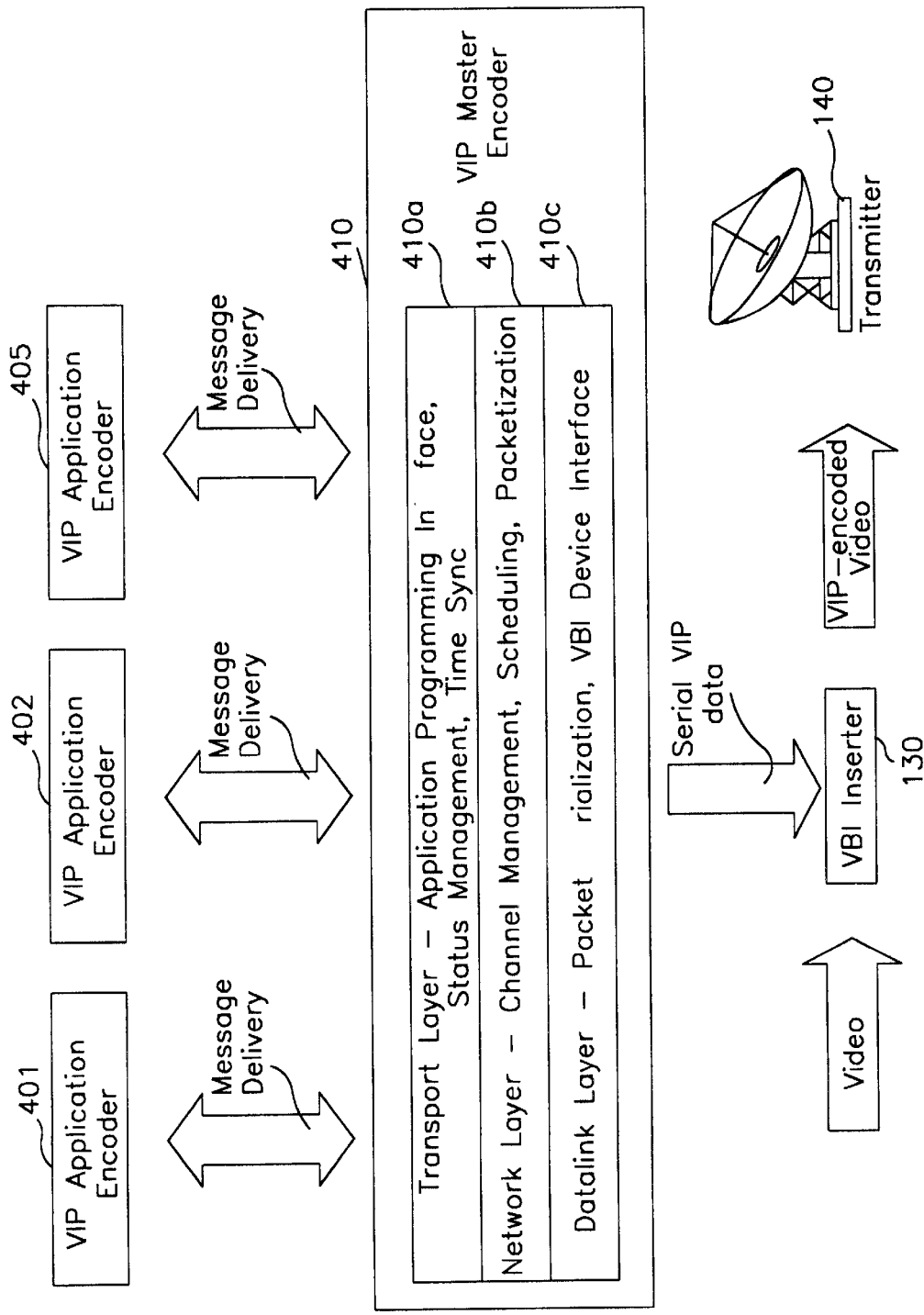
FIG. 4 shows the software architecture of an encoder.

FIG. 4 shows an example software architecture of the processes which include the encoder. A plurality of processes either resident within a single device (e.g. 100 of FIG. 1) or each of a plurality of client encoders (e.g. 110–114) may include a plurality of client application programs 401–403 which communicate via messages to the main video indexing protocol (VIP) encoder 410. VIP encoder 410 implements the transport, network and data link layers of the ISO/OSI networking model via separate portions 410a, 410b and 410c of the encoder. Client applications operate at the application layer. The VIP encoder 410 provides the necessary communication between the application layer (client application programming interface or API) and the VBI inserter 130 which resides at the physical layer. Specific client applications which may include stock quotes, may be provided. VIP encoder 410 may further accept as inputs timecode, GMT time references, or other time reference via an internal or house clock at the encoder via a special-purpose client application program which is used for transmitting status information to decoders, such as 200 shown in FIG. 2.

Figure 5:
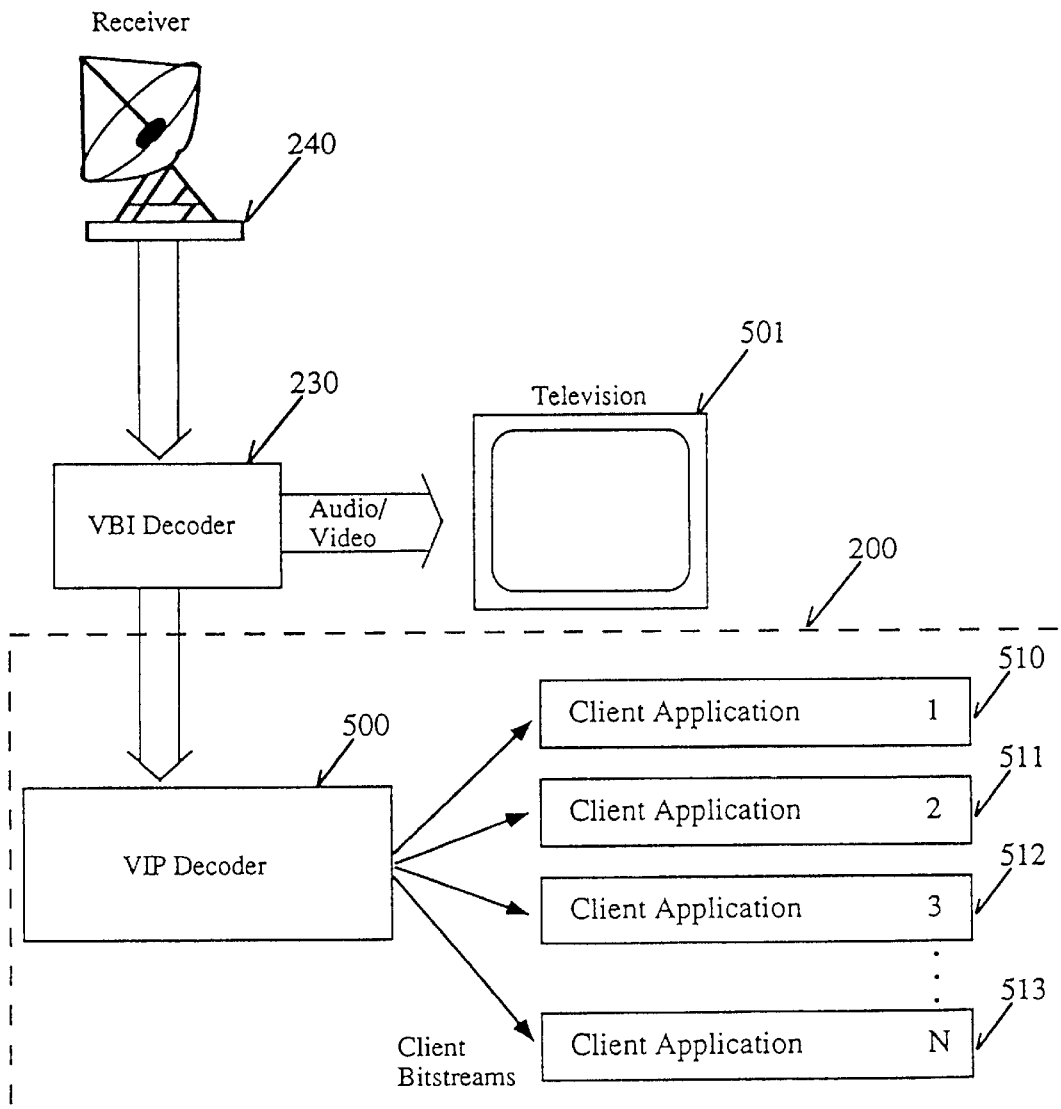
FIG. 5 shows the software architecture of a decoder.

FIG. 5 illustrates a more detailed view of the software processes operative within a decoder (e.g. 200 of FIG. 2). The decoder will include a VIP decoder process 500 which communicates with the VBI decoder apparatus 230 after decoding of the input data from the audio/video programming received from downlink 240. The VIP decoder 500, like the VIP encoder 410, communicates with a plurality of registered client applications 510–513 via client bitstreams, which each may comprise a separate portion(s) of the multiplexed data stream, according to the client applications' requirements.

Figure 6:
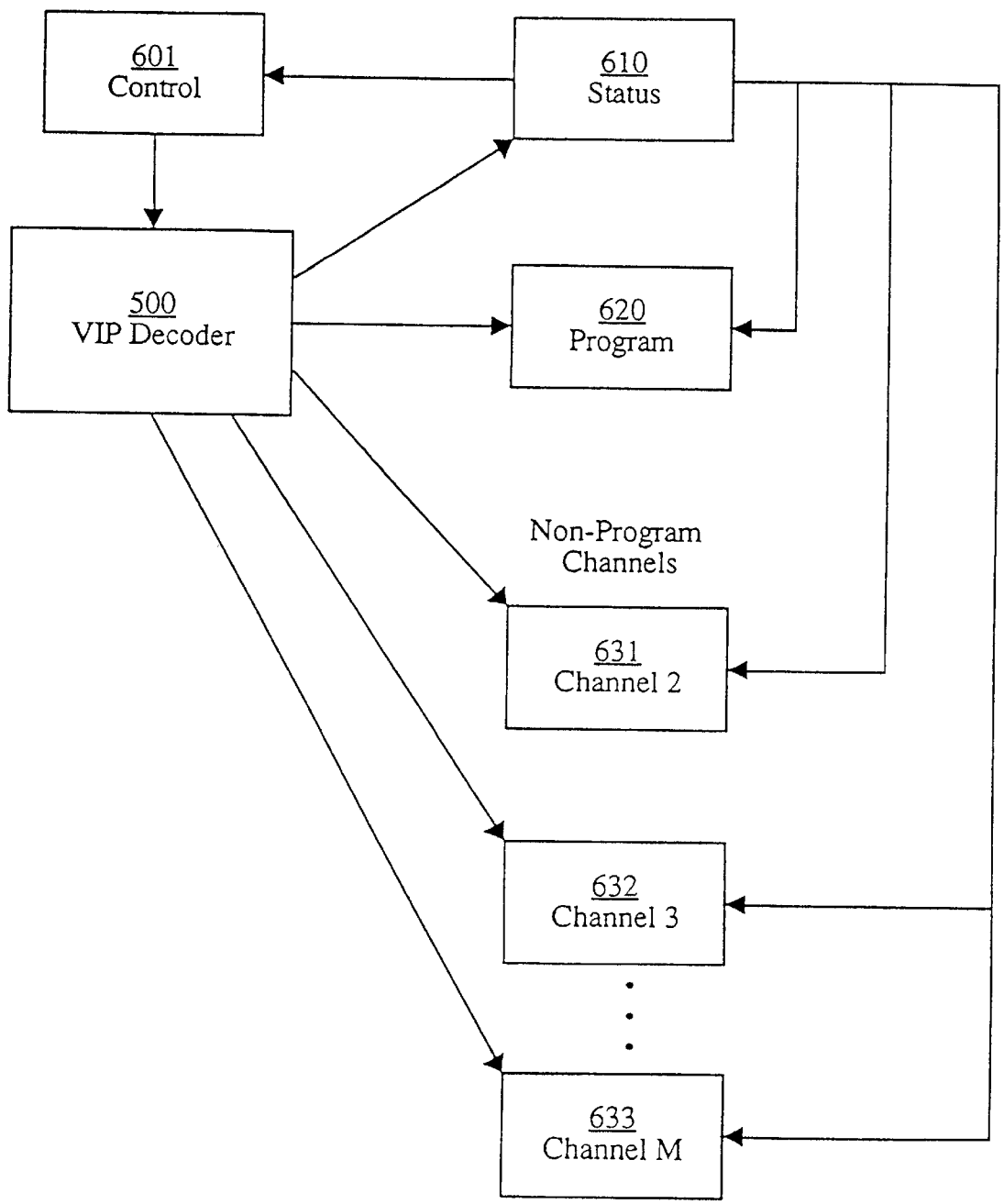
FIG. 6 shows a specific implementation of the software in a decoder.

In implemented embodiments of the present invention, 256 separate prioritized channels are capable of being transmitted between a VIP encoder/decoder and client processes. The VIP decoder may extract a status channel for status information which is received from the encoder at periodic intervals, which is used for controlling/timing the decoder and the other client application programs. This may be handled by a status client 610 as illustrated in FIG. 6, which communicates with a control module 601, which is responsible for controlling the decoding process 500 itself. In addition, status information may be provided to the program application 620 which is responsible, for example, for receiving real-time descriptive information about the program. Such descriptive information may include program/story/segment markers, full-text of the program and/or other descriptive information about the program which is synchronized with transmission. The details of program descriptive information will be discussed in more detail below. Status information may also be input to any and/or all other client application programs 631–633, according to implementation. The remaining non-program channels of information, which have a lower priority than status and program information, may include stock quotes, sports scores, weather, or other information which is transmitted (and received) as bandwidth permits.

Figure 7A:
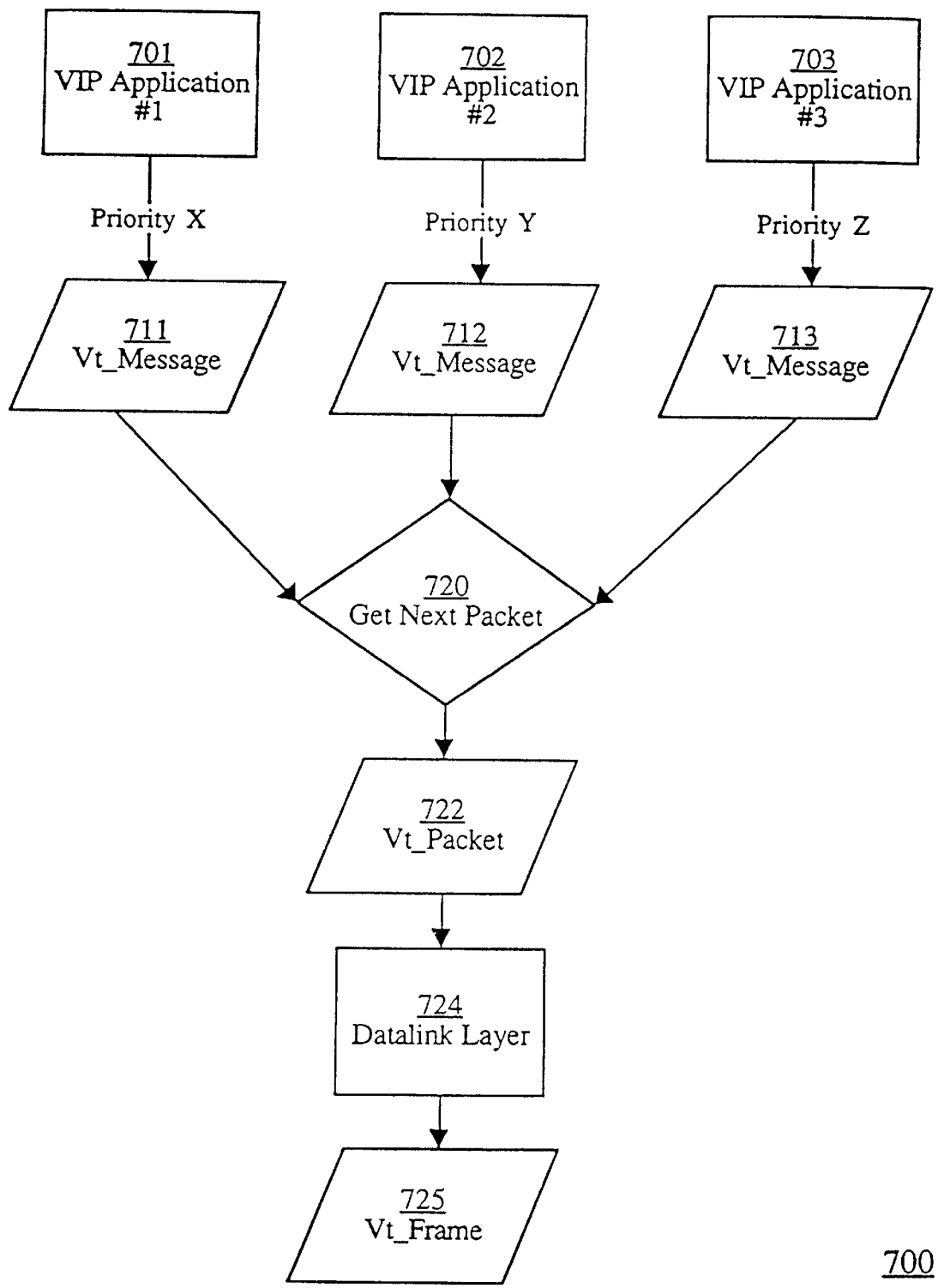
FIG. 7a shows the processes performed by the encoder process.
Figure 7B:
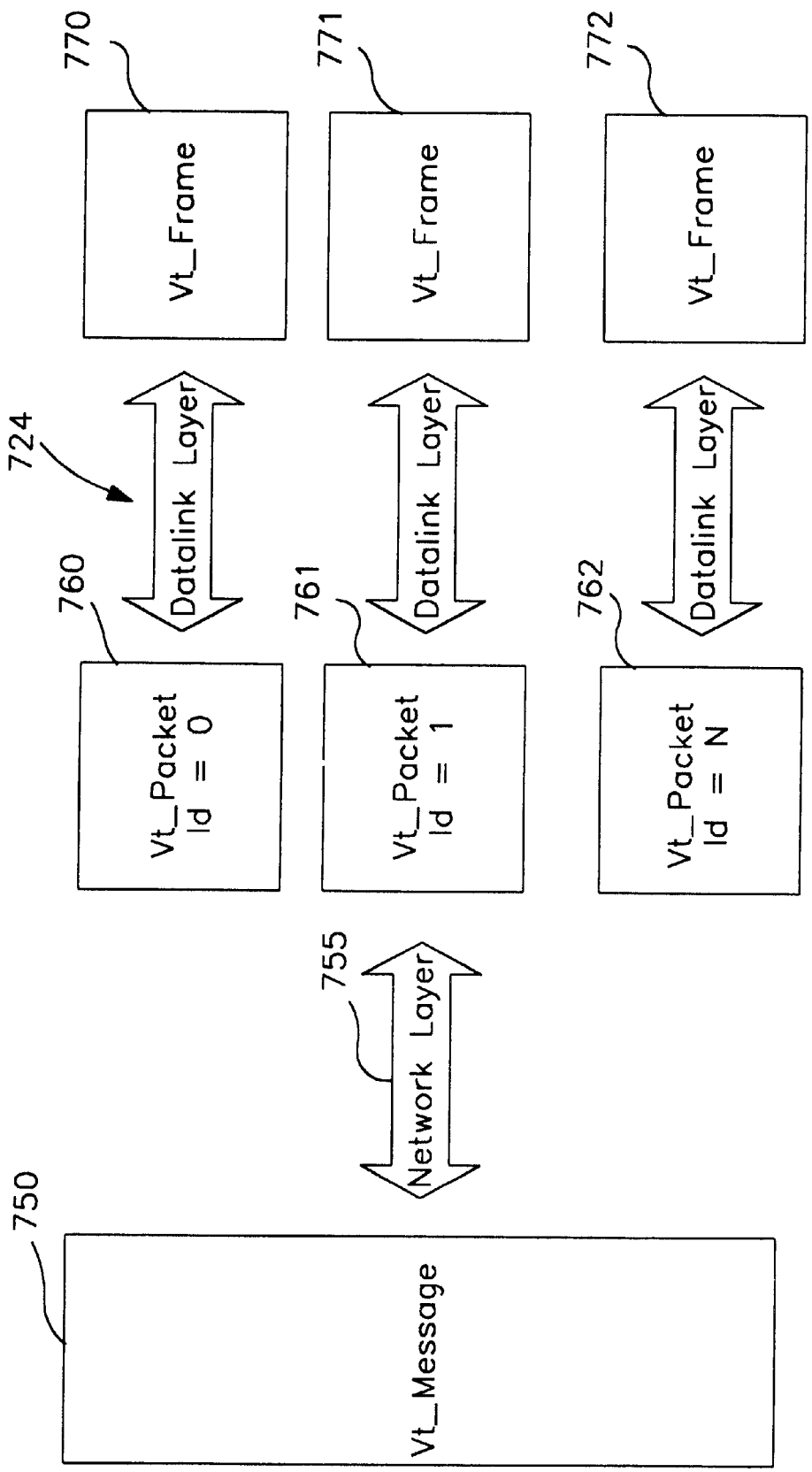
FIG. 7b shows the relationship of the messages, packets and frames in the encoder in relation to the ISO/OSI model in one embodiment of the present invention.
Figure 8:
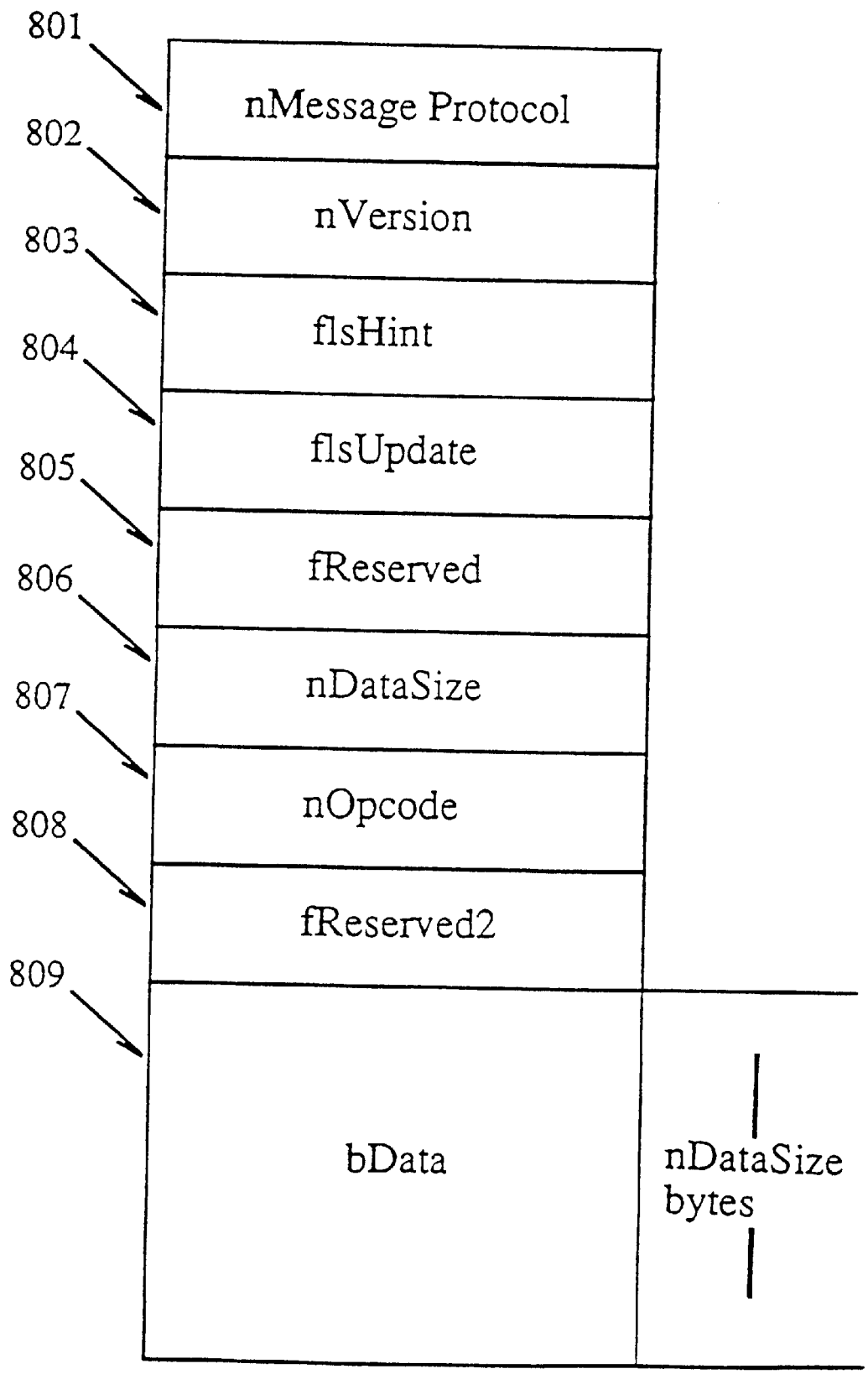
FIG. 8 shows the format of a message used for the application program interface (API) between the encoder/decoder and client applications.

The specifics of the function of the encoder will be described in more detail with reference to FIG. 7a. A plurality of VIP application programs 701–703 communicate with the VIP encoder process 400 via Vt_Messages, the details of which are illustrated in FIG. 8. Each of the applications is prioritized. For example, a status application has priority 0 (the highest), and program information has priority 1 (second highest) and other, non-program channels, have priority 3. When Vt_Messages 711–713 are received by the encoder, transmission of packets such as 722 to the data link layer is performed on a prioritized round-robin basis. In other words, highest priority Vt_Message channels are serviced until exhausted, and channels having the same priority are serviced in round-robin fashion. These are then converted by the datalink layer 724 into frames 725 for transmission to VBI inserter 130. The details of the reception of messages and transformation of messages into packets, and packets into frames is shown in FIG. 7b.

Figure 9:
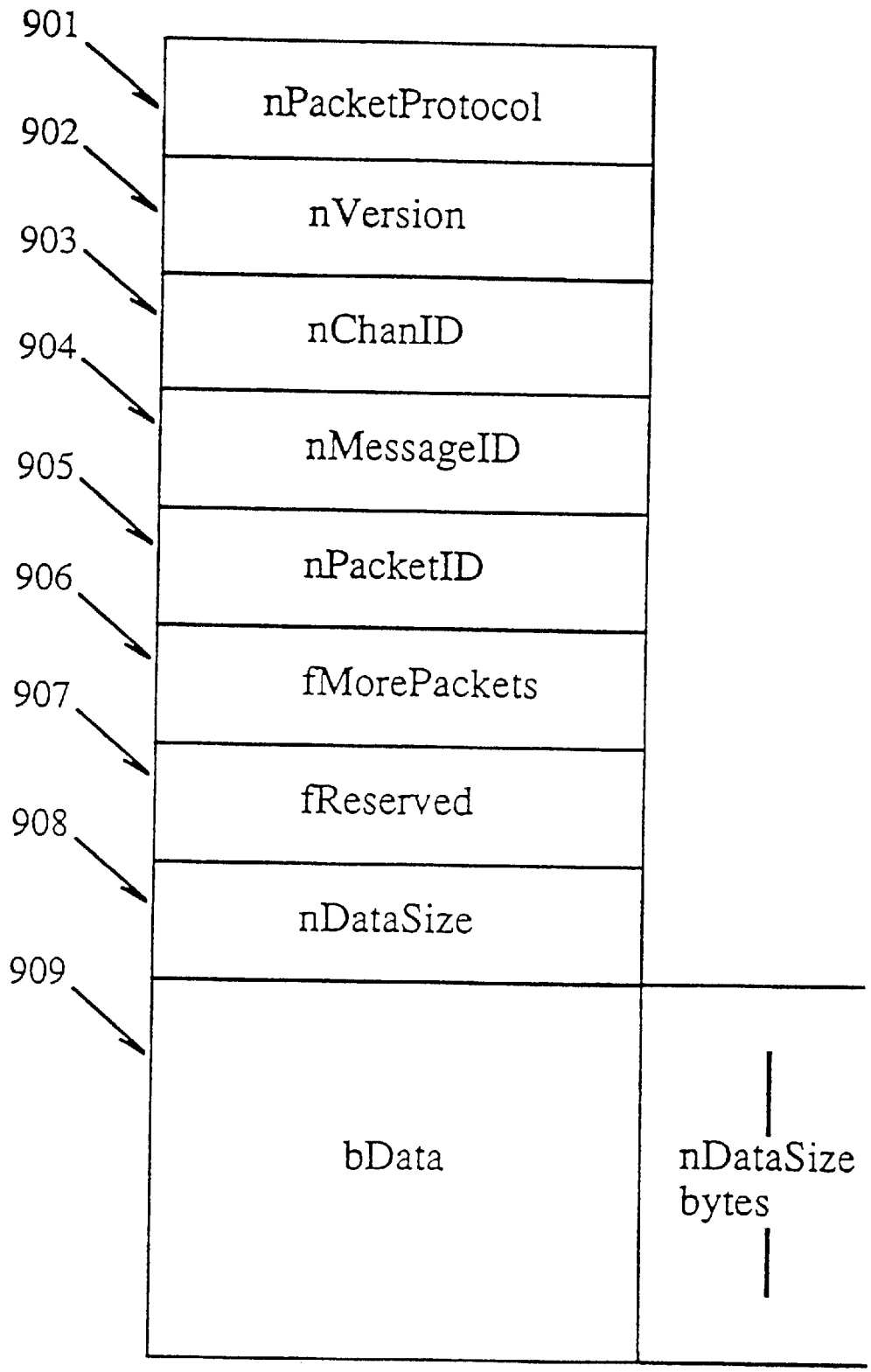
FIG. 9 shows the format of a packet.

As Vt_Messages 750 are serviced in the input buffer they are transformed by the network layer 755 in the encoder into Vt_Packets 760–762, illustrated in more detail in FIG. 9. Packets are identified by message number and their sequence in the message. Once packetized by the network layer 755, these messages are then sent as packets 760–762 to the datalink layer 724 in the encoder. The datalink layer 724 then creates a Vt_Frame 770–772 for each of the packets 760–762, respectively. These frames are then transmitted to the physical layer for encoding into the vertical blanking interval by the VBI inserter 130. Vt_Frames are discussed and described in more detail with reference to FIG. 10, below. Vt_Frames are serialized and then encoded by VBI inserter 130 for transmission in any number of prior art manners.

The format of a Vt_Message is illustrated as 800 in FIG. 8. Each message contains a first field nMessageProtocol 801, which is represented as a byte used for identifying the information transmitted (e.g. status, program, stocks, sports, weather, etc . . . ). In this way, the messages can be prioritized. The next field nVersion 802 is represented as a byte used for identifying the version of this protocol which is being used. The field fIsHint 803 indicates that the message is being provided before an event. This allows equipment in the receiver to "pre-roll" as necessary. The fIsUPdate field 804 indicates updated information (e.g. outline updates or revised news stories). The fReserved 805 field is currently not used. The field nDataSize 806 is a double-word used for specifying the number of bytes of the data contained in the bData field 809. The field nOpcode 807 is used for specifying the specific operation to be performed upon the data contained in the message. Applications communicate with the encoder by opening a communication channel and send messages to the encoder. In this example, opcodes may be integer values specifying any of the following: GetStationID, SetStationID, GetTime, SetTime, GetChannelMap, ChannelOpen, ChannelClose, ChannelGetPriority, ChannelSetPriority, and SendMessage. The next field fReserved2 808 is currently not used, and bData field 809 is variable length, according to the length of the data specified in field 806. Responsive to any of the operations specified by the opcodes, the encoder may sent result codes to the client applications, such as error or completion codes. These result codes may include: ChannelAlreadyOpen; ChannelNotOpen; ChannelBusy; NotChannelOwner; ProtocolMismatch; CommError; NoMoreChannels; NoMessage; or BadData.

As discussed above, the scheduler in the encoder services applications according to the priority of the channel, and then in round-robin fashion, for creating and transmitting packets. The structure of a packet is illustrated in FIG. 9. 900 of FIG. 9 shows the format of the packets which are created and then transmitted in the serialized multiplexed bitstream in Vt_Frames to the VBI inserter 130. The nPacketProtocol 901 field is a byte-length field which identifies the packet as one supported by this protocol or other values for other protocols which may be transmitted in future embodiments. The nVersion 902 is used for specifying the version of the encoder which is creating and transmitting the packets. The nChanID field 903 is a byte specifying, as an integer value, the channel number of the packet in the serialized bitstream. The nMessageID field 904 specifies the message number on the particular channel, from which the packet was obtained. This is used for sending the message in the proper order at the decoder. The nPacketID field 905 is the number of the packet in the particular message. Again, this is used for constructing the message. The fMorePackets field 906 is a boolean used for specifying whether there are any more packets for the message. If not, then the decoder can detect that it has all the packets for the message, and can transmit the message to the proper client(s). The fReserved 907 field is currently unused and the nDataSize field 908 specifies the size of the bData field 909 in bytes. The bData field 909 is a variable-length field which is used for containing the data. It has the length specified in nDataSize field 908.

Figure 10:
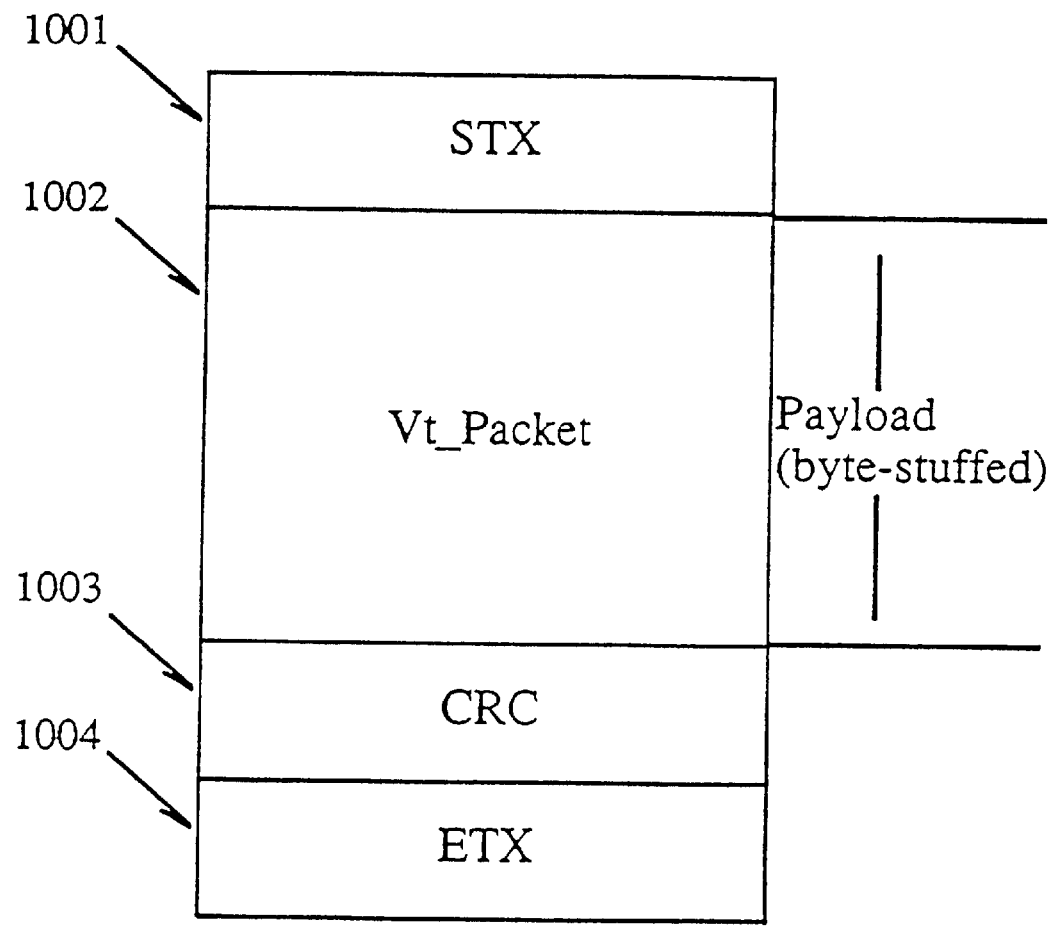
FIG. 10 shows the format of a frame.

FIG. 10 illustrates the format of a Vt_Frame 1000, which is transmitted to the VBI inserter 130. VIP packets are serialized into byte stream frames to be sent to the VBI inserter 130. Frames consist of fields for indicating the start and end of the frame, and data is pre-stuffed so that it doesn't have any occurrences of the start or end characters. As illustrated in FIG. 10, the start frame field STX 1001 thus precedes the Vt_Packet information 1002, a single Vt_Packet, such as 900. The bitstream 1002 is followed by a CRC check field 1003, and an end of frame character ETX 1004 to indicate the end of the frame.

Figure 11:
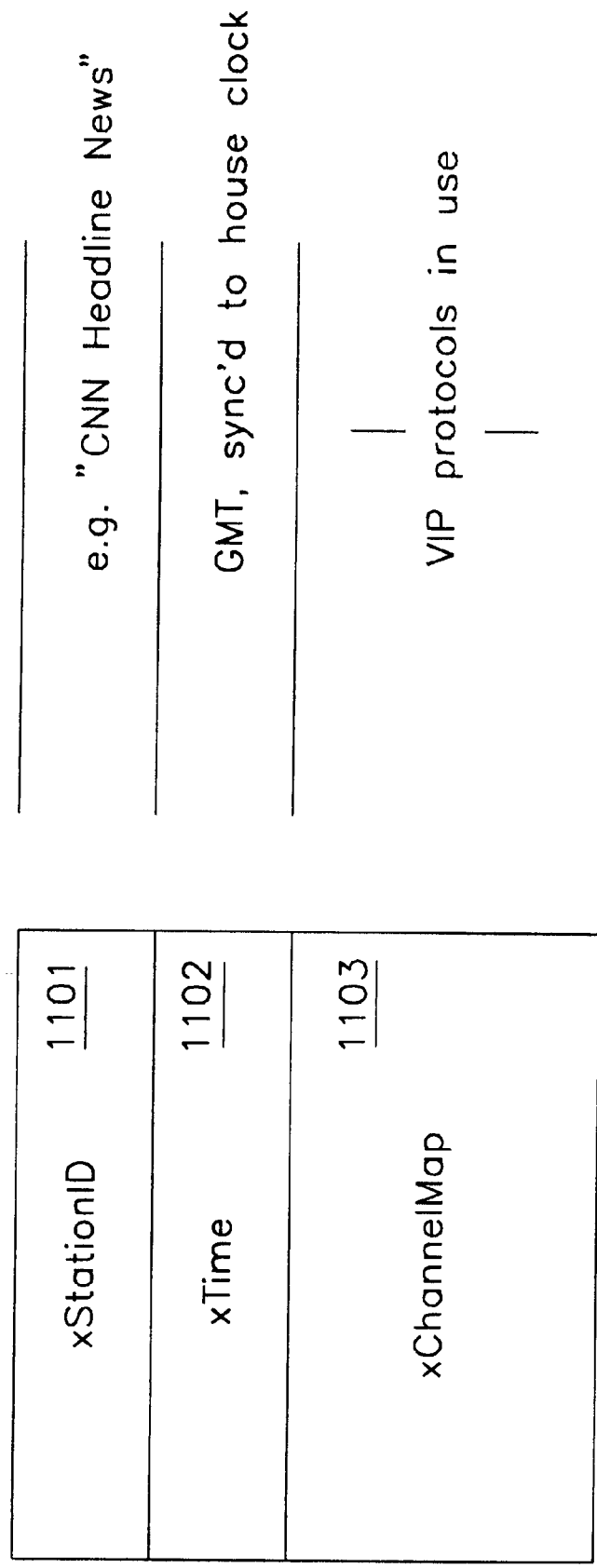
FIG. 11 shows the format of a status composite packet.

FIG. 11 illustrates Vt_Status_Composite packet, which is generated by the encoder and is sent to all decoders at regular (e.g. 5 second) intervals. The Vt_Status_Composite packet allows synchronization of decoder applications to the encoder. The packet 1100 includes a xStationID field 1101, which identifies the station performing the transmission (e.g. "CNN Headline News"). The packet includes the xTime field 1102, which is a time reference synchronized to the house clock of the transmitter. In implemented embodiments which transmit status packets at 5 second intervals, the time is GMT, however, in other embodiments, SMPTE time codes may be used wherein status packets are sent every video frame (30 fps). Other time references may be used, according to implementation. Finally, a channel map 1103 is included in the packet, which includes the highest channel transmitted, and a variable size portion containing identifying information for each channel (e.g. VIP protocols).

Figure 12:
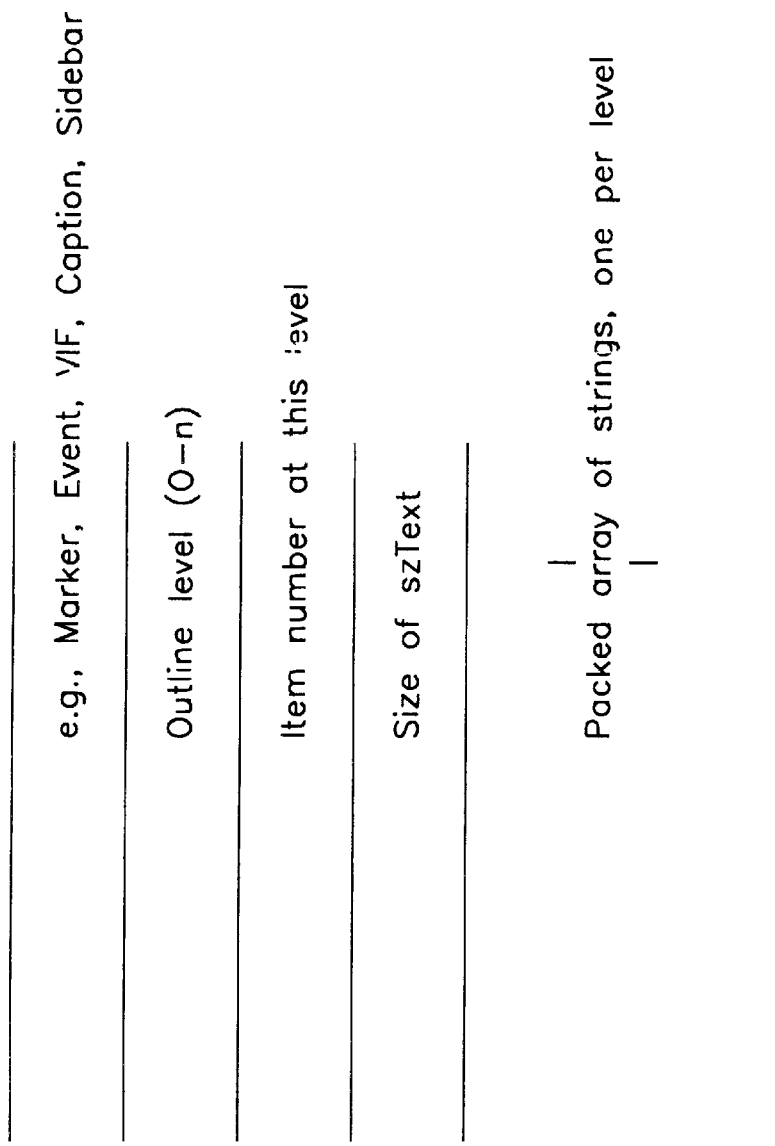
FIG. 12 shows the format of a program marker packet.
Figure 12:
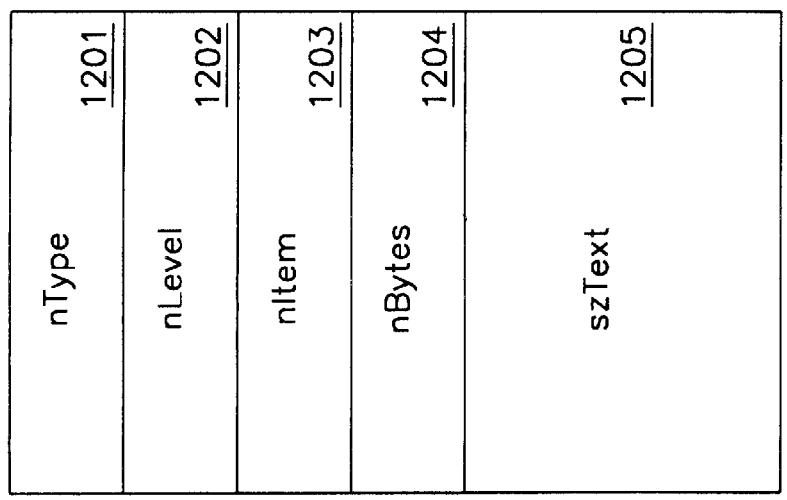

FIG. 12 illustrates a program packet, Vt_Program_Marker 1200, which is used for real-time description of audio/video program data. Other program packets may also be transmitted. These include:

1. events—which encode a momentary type of action, such as a camera switch, zoom, transition or other editing command. This type may include:
    a. a type (camera switch, zoom, transition, etc . . . ).
    b. a length;
    c. body (data for the event);
2. VIF's (video image format)—indicates that a plurality of frames should be captured by a digitizing board in the receiver. This may be stored and used for reference (e.g. a weather map);
3. captions—full-text of all spoken material;
4. sidebars—referential data. These may include, but not be limited to:
    a. URL (Universal Resource Locaters)—for locating information on the WWW (World-Wide Web) which may be related to the program;
    b. OLE Pointer—Microsoft's Object Linking and Embedding protocol for locating data on the client machine which is program-related.

Vt_Program_Marker 1200 is used for real-time identification of the program which is being transmitted. It is transmitted every 5 seconds, or when the status of the program (e.g. nLevel or nItem) changes. Other types of program packets are sent on an as-needed basis according to the application's requirements. Program markers can be sent synchronized with the video program, or some time period in relation to the program, according to implementation. For example, program markers of a certain type may precede the event by some relationship in order to allow activation and synchronization of device(s) in the receiver. The nType field 1201 precedes program packets to identify the type of the packet (e.g. marker, event, caption, sidebar, etc . . . ) There are also different types of markers which may be encoded into field 1201 which specify: program; story; segment; section; segment; or commercial. These are used to indicate the beginning/ending of a program chunk.

Vt_Program_Marker 1200 uses nLevel field 1202 to identify the outline level which this marker describes. This will be used to display, access, or reassemble the program. The nLevel field 1202 may be used to display identifying information in outline form on a client computer. The nItem field 1203 identifies the particular item at the identified outline level. The nBytes field 1204 identifies the length of the strings which have been packed into field szText 1205. For example, if the nLevel field 1202 contained a 2, then there would be three strings (for three levels) packed into szText field 1205 (the level is 0 based, wherein 0 is the first level). For a news program, the information may include, for example: Program—"CNN Headline News; Segment—"Dollars & Sense"; and Story—"Intel Stock Soars." For a televised play, this may include, for example: Play—"Henry IV"; Act—"Act Three"; and Scene—"Scene Five-Cade Conspires with Dirk." Other types of program packets, may also be transmitted, and are within the spirit and scope of the present invention.

Figure 13:
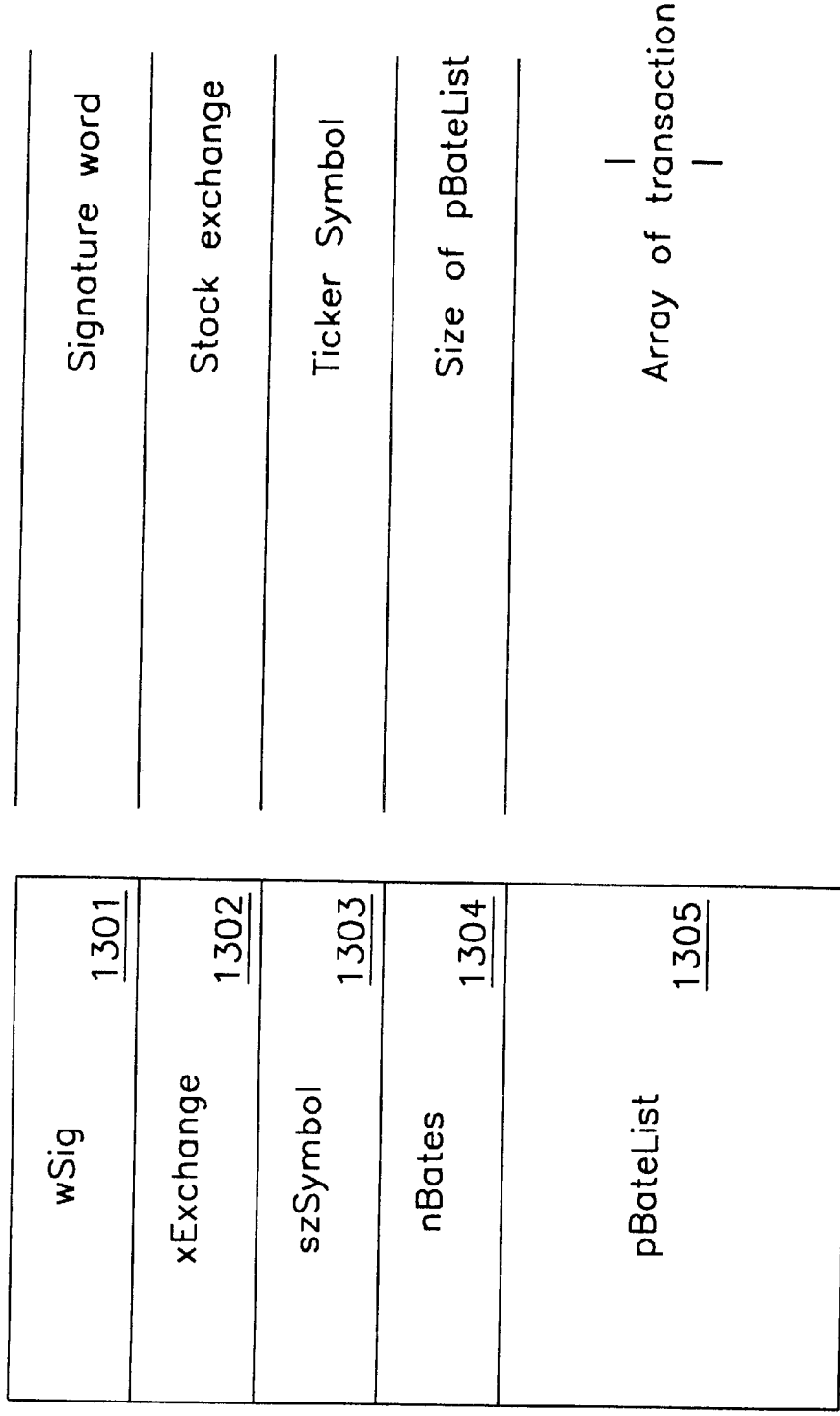
FIG. 13 shows the format of a non-program stock quote packet.

Other types of non-program packets may also be transmitted. These include: stock quotations; sports scores; and weather information. These are transmitted in priority after both status and program information on a bandwidth-available, real-time basis. An example of a stock quotation packet is shown in FIG. 13 as Vt_Quote_Tick packet 1300, which is sent every time a stock quote is read off a feed to the encoder. This packet includes a signature word field wSig 1301 for identifying the quotation; a stock change exchange identifier xExchange field 1302; a ticker symbol field szSymbol 1303; a number of transactions field 1304; and a transactions array 1305, containing transaction information for the number of transactions specified in field 1304.

Figure 14:
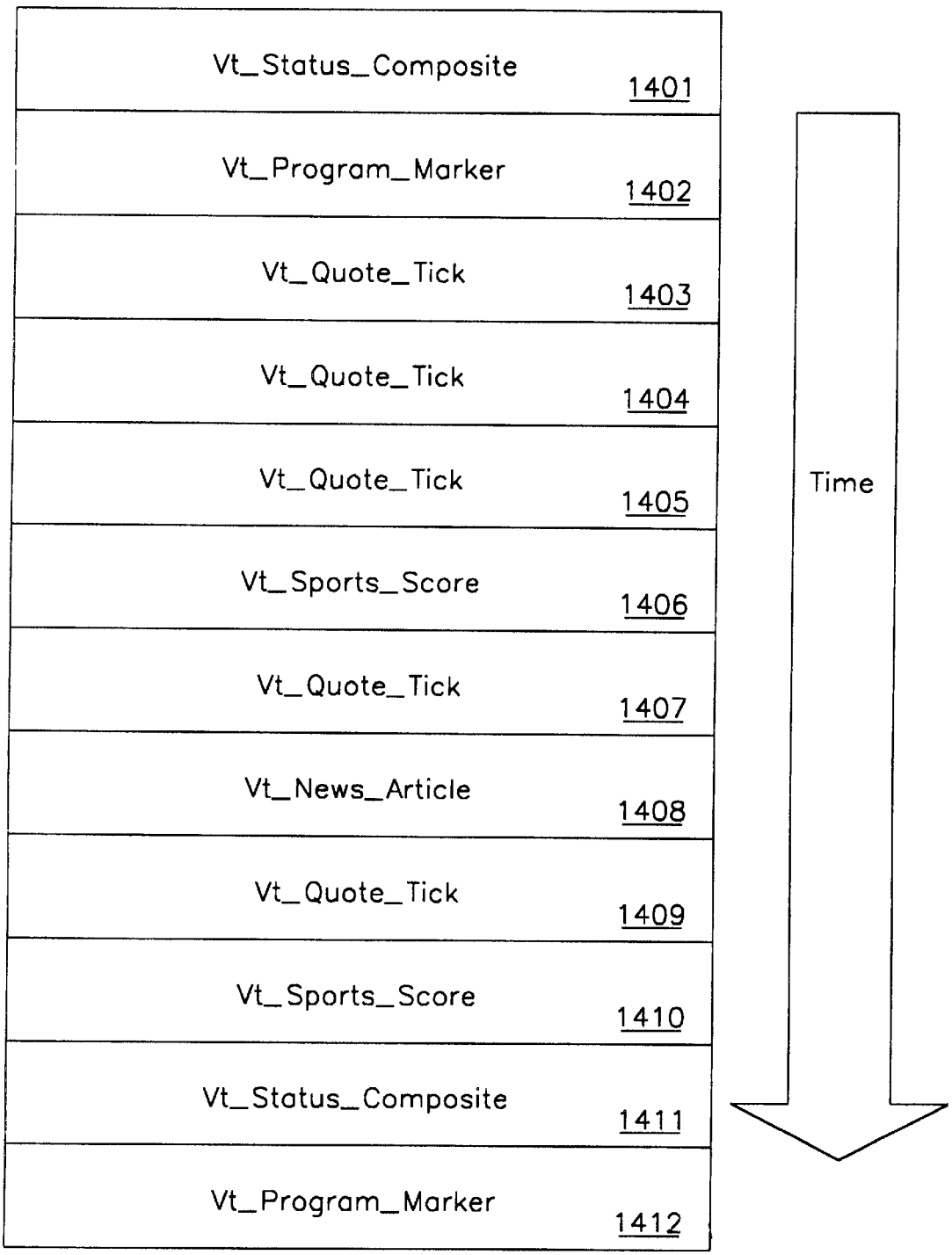
FIG. 14 shows an example packet bitstream.

A typical VIP bitstream is illustrated as 1400 in FIG. 14. Packets are illustrated as 1401–1412, wherein status packets are sent on a regular basis (e.g. every 5 seconds) such as 1401 and 1411, in order to keep the receiver(s) synchronized with the transmitter. Program marker packets such as 1402 and 1412 are similarly sent, as well as when program content changes, in order to indicate the change. Non-status, non-program packets 1403–1410 are sent in the remaining time, in round-robin fashion, as bandwidth permits.

Figure 15A:
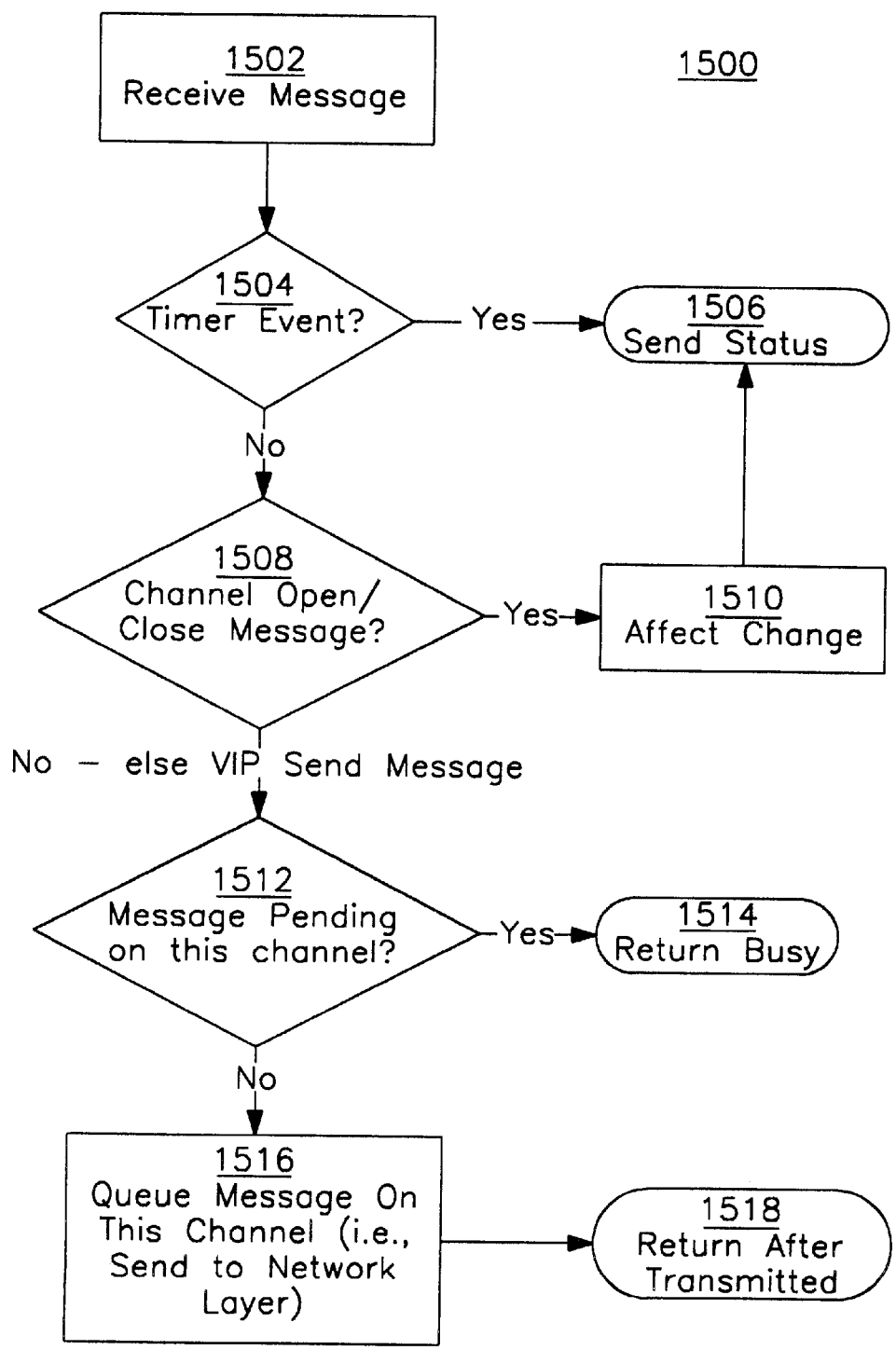
FIGS. 15*a*–15*c* show the operation of the encoder's main processes.
Figure 15B:
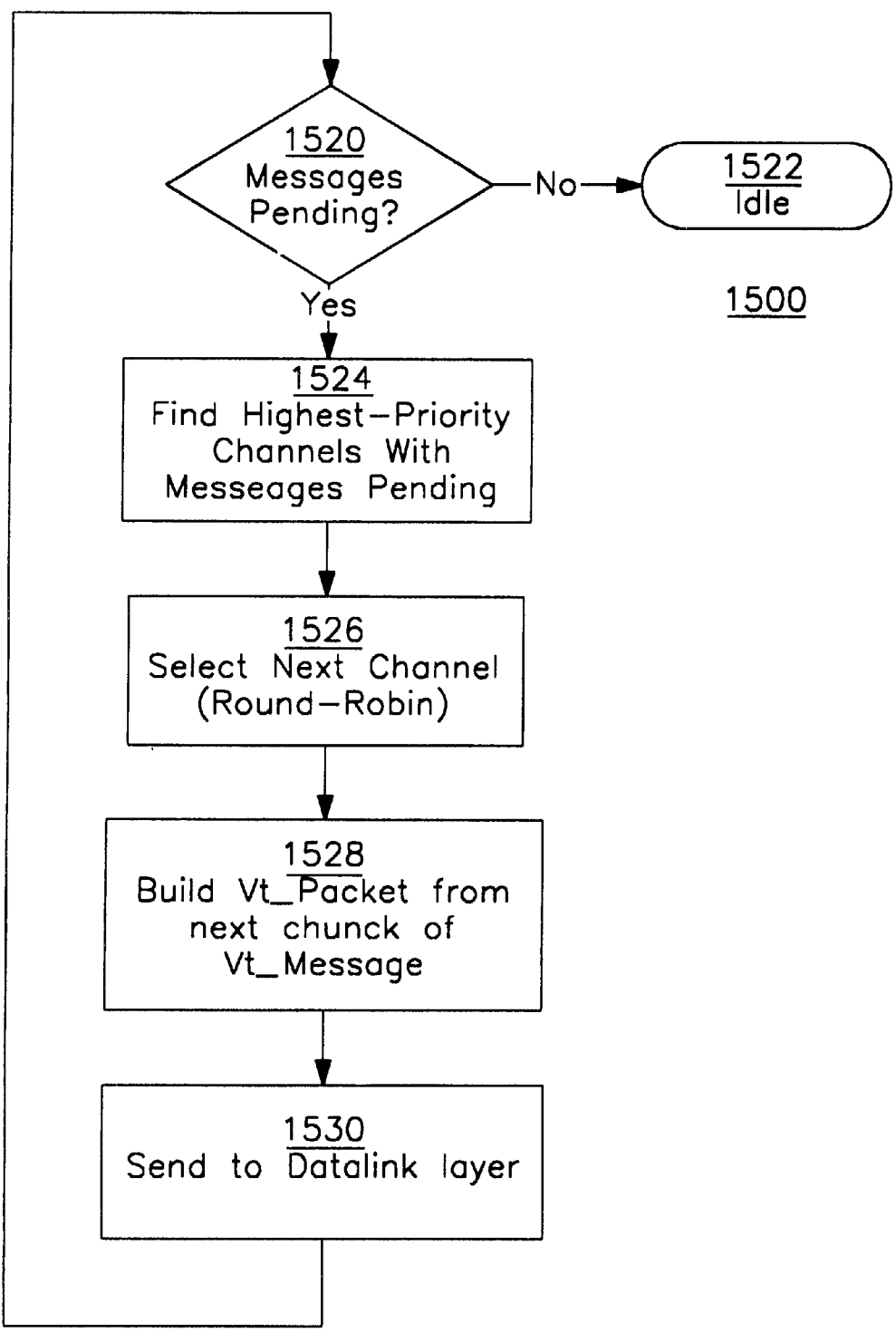
Figure 15C:
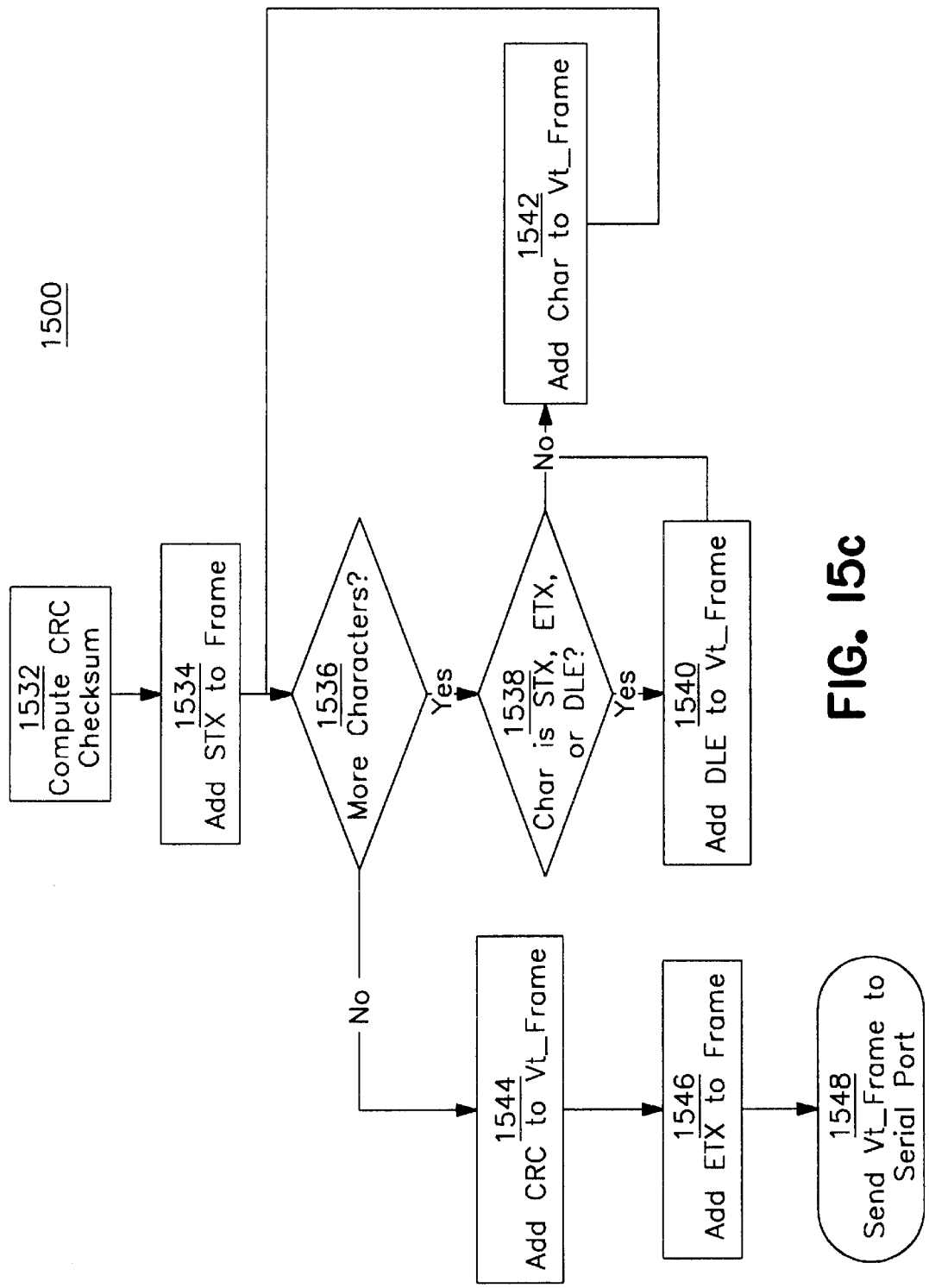

The encoders' three main processes for the different layers are shown in FIGS. 15a–15c. FIG. 15a illustrates the sequence of steps performed by at the Transport/API layer of the ISO/OSI model. Note that processes are implemented using object-oriented techniques, and thus, source code references object(s) and accompanying processes which service those object(s). Thus, the precise sequence of execution of the three subprocesses shows in FIGS. 15a–15c may not necessarily be precisely sequential. At any rate, the Transport/API layer receives a message from a client application, and determines whether it is a timer event (e.g. thus requiring transmission of a status message) at step 1504. If it is, then at step 1506, a Vt_Status_Composite message is sent. If not, it is determined whether the message is of the ChannelOpen/Close type. If so, then the corresponding action is performed at step 1510, and a status message is sent indicating the change in channel. If the message was not of the open/close type, as detected at step 1508, then the process proceeds to step 1512, which determines whether a message is pending on the channel. If so, then a responsive message (e.g. ChannelBusy) is returned to the application at step 1514, and the application can take some corrective action. If not, then the message is queued on the current channel at step 1516, and sent to the network layer for packetizing. The process is thus complete at step 1518.

Network layer processing in the encoder is illustrated in FIG. 15b. If no more messages are pending in the message, as detected at step 1520, then the process remains idle at step 1522. If, however, message(s) are awaiting processing, then the highest priority channel with message(s) waiting is determined at step 1524. The next channel with the selected priority is then selected for message processing at step 1526, in round-robin fashion. This is to allow equivalent processing of messages for applications having the same channel priority. A Vt_Packet is then constructed from a portion of the Vt_Message from the selected client at step 1528. The maximum packet length for each packet is used until the message is exhausted, wherein the last packet for a message is variable length, according to the portion of the message which remains. Once this has been performed, the Vt_Packet is then sent to the Datalink layer, at step 1530, and the process continues processing messages at step 1520.

FIG. 15c illustrates the datalink layer processing which is performed in the encoder. The steps 1532–1548 are performed on each Vt_Packet received from the network layer in order to create a Vt_Frame. First, at step 1532, a CRC (cyclic redundancy check) computation is performed upon the packet, at step 1532. Then, a start of frame character STX is added to the frame at step 1534.

The processing of the packet then commences, wherein a check at step 1536 determines whether there are any more characters to be processed in the packet. If so, then the process proceeds to step 1538. Loop 1536–1542 packs the packet, preceding any occurrences of the STX, ETX or DLE (data-link escape) characters by DLE. If the character is none of these three, as detected at step 1538, then it is placed into the frame at step 1542. If it is one of the three characters, then it is preceded by the insertion of DLE at step 1540, and placed into the frame at step 1542. Step 1536 then repeats until no more characters are in the packet.

Once processing of the packet is complete, as detected at step 1536, then the process proceeds to step 1544, wherein the computed CRC is placed into the frame to allow parity checking. An ETX character is then added to signify the end of the frame at step 1546, and the Vt_Frame can then be transmitted to an output serial port of the encoder, step 1548, in order to be merged with the audio/video program (e.g. by VBI inserter 130). Encoding is thus complete.

Figure 16A:
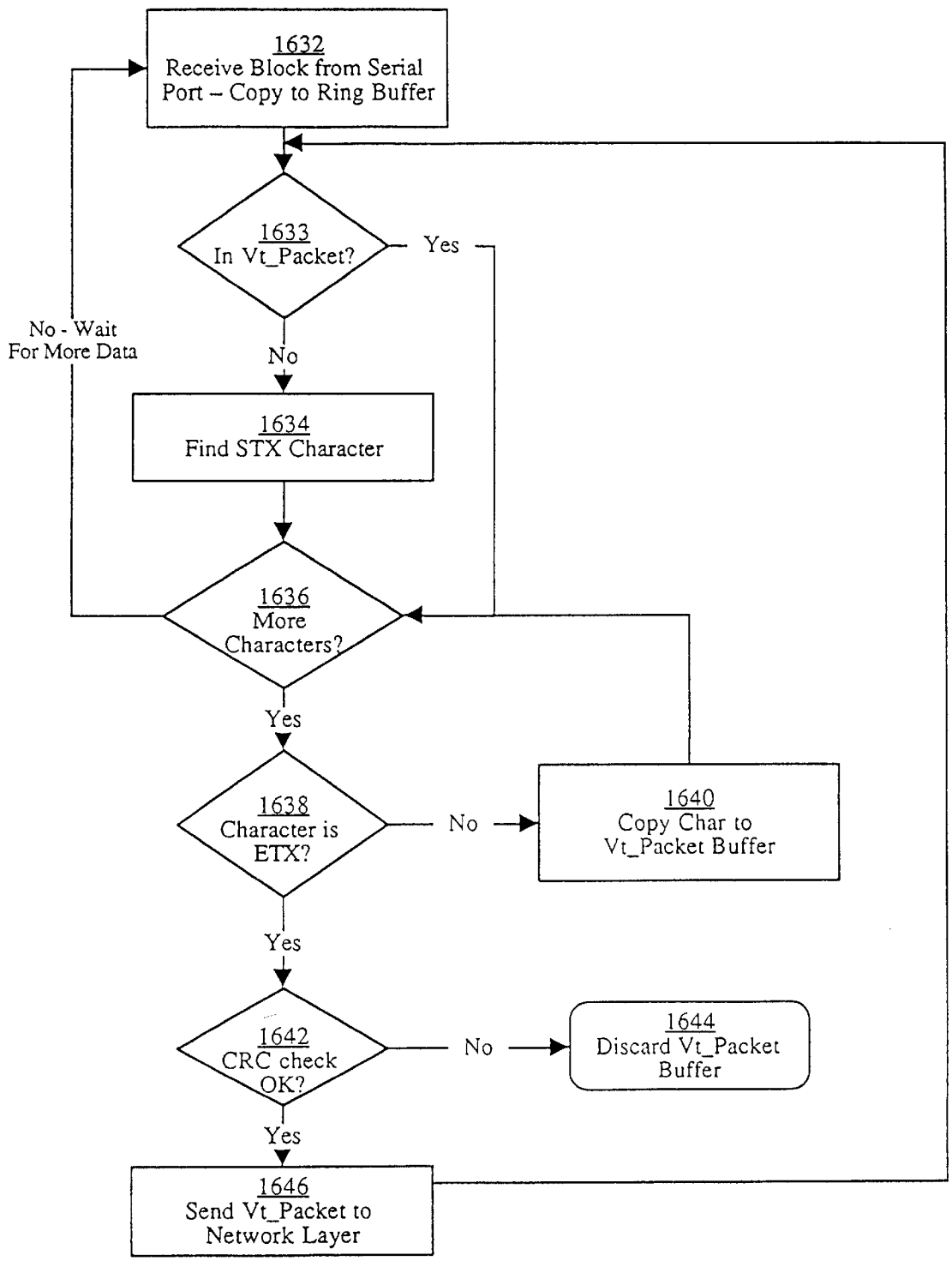
FIGS. 16*a*–16*c* show the operation of the decoder's main processes.
Figure 16B:
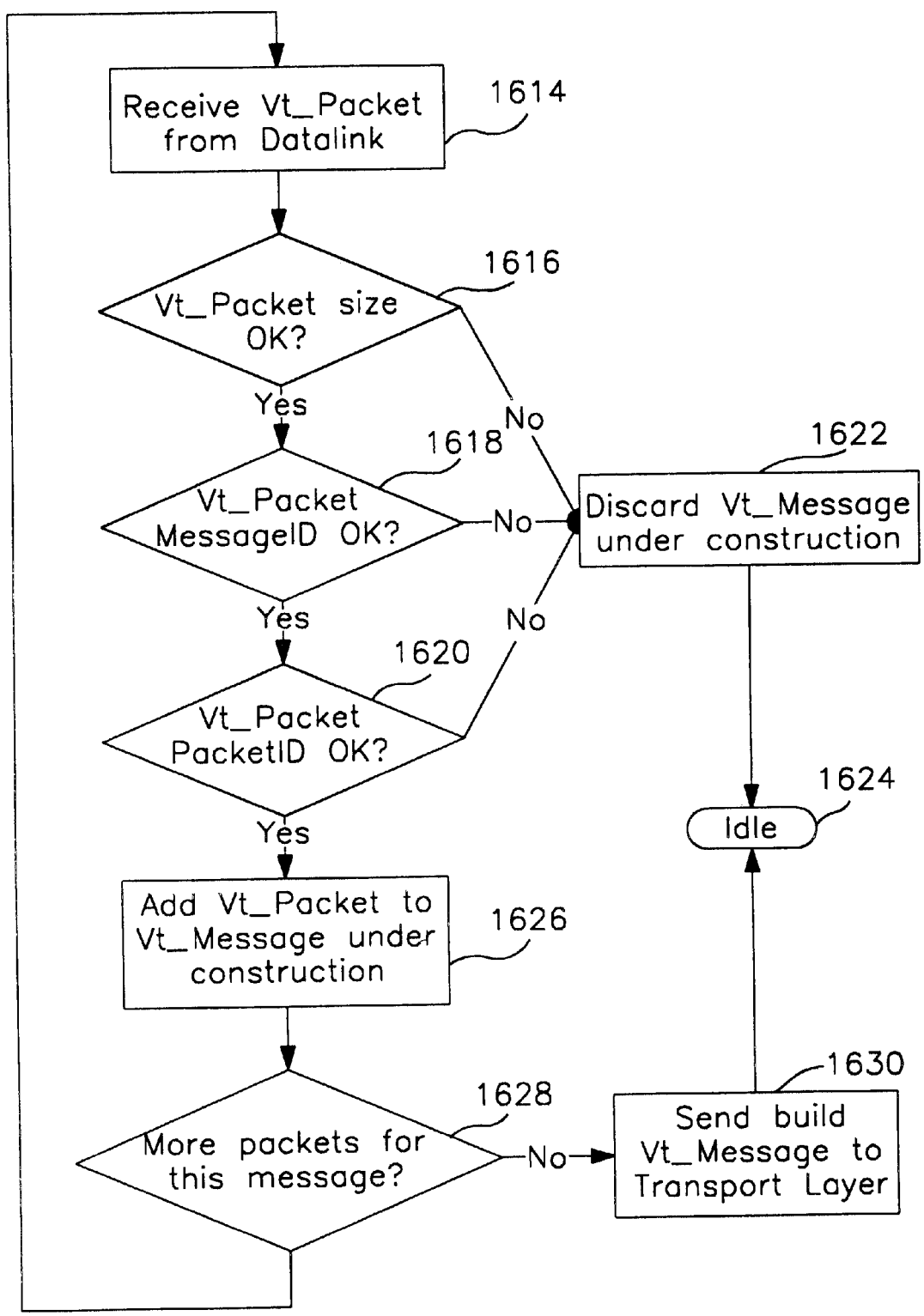
Figure 16C:
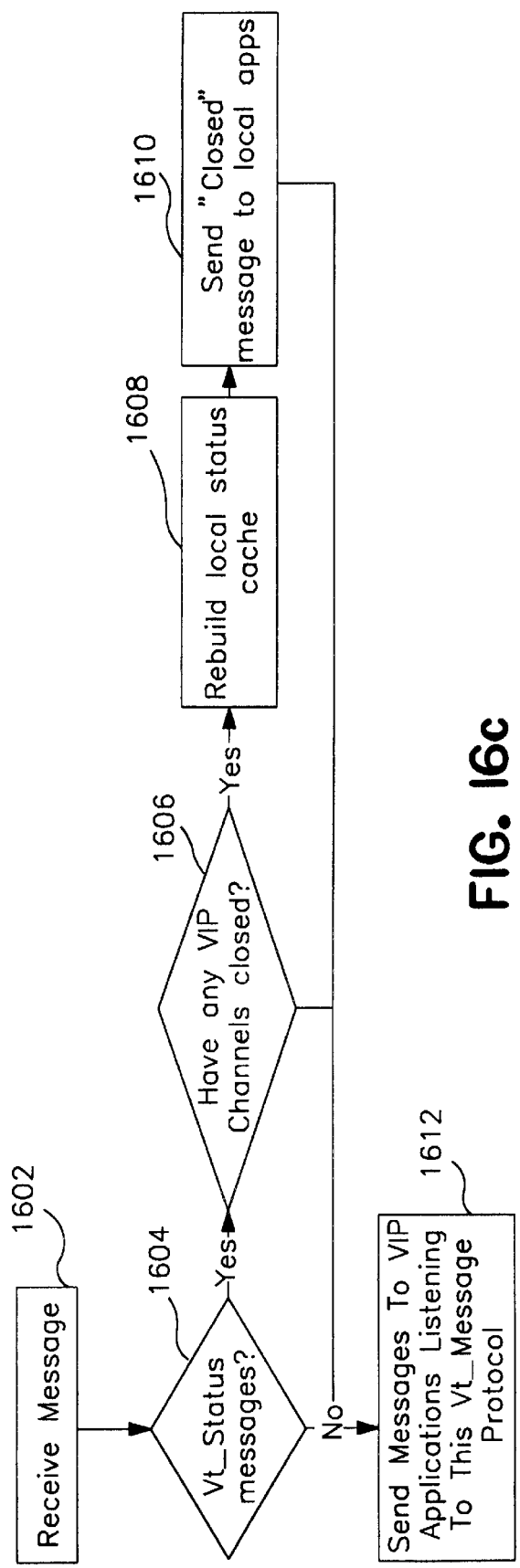

The decoder's operation at the three network layers is shown in FIGS. 16a–16c. Datalink processing in the decoder is illustrated in FIG. 16a. Datalink processing is performed at step 1632 wherein a block is received from a serial port (e.g. from VBI decoder 230), and copied to the ring buffer. At 1633, it is determined whether a Vt_Packet is currently being examined. If not, then the STX character is located at step 1634 to locate the beginning of the message. Upon completion of step 1634 or upon determination that a Vt_Packet is already being examined at step 1633, it is determined at step 1636 whether any more characters are are in the ring buffer to process. If not, the block reception continues at step 1632. If there are more characters tin the ring buffer, as detected at step 1636, then the process proceeds to step 1638 wherein it is determined whether the character is an ETX character. If the character is not an ETX, then the character is copied to the VT_Packet buffer at step 1640. This loop continues until no more characters are to be processed in the ring buffer, or the ETX character is located. Once the ETX character is detected at step 1638, then the end of the frame has been reached, and the processing of the packet can take place. At step 1642, a CRC of the packet is performed. If it fails, the data has been corrupted, then the Vt_Packet buffer is discarded at step 1644. If the CRC check passes, then the Vt_Packet may then be sent to the network layer at step 1646. Then, the process continues to wait, in loop 1632–1636, to locate the STX character and determine if any more characters are received.

Network layer processing is shown in FIG. 16b. A Vt_Packet is received at step 1614. Steps 1616–1620 check the Vt_Packet_Size, to determine if any bits were lost, Vt_Packet_MessageID, to determine if this refers to a valid message, and Vt_Packet_PacketID, to determine if this refers to a valid packet in the message. If any of these checks fail, then the Vt_Message under construction is discarded at step 1622, and the process proceeds to an idle state 1624, until a subsequent Vt_Packet is received. Once the packet is determined as valid, as detected at steps 1616–1620, the Vt_Packet is then added to the message under construction at step 1626. Then, if there are no more packets in the message, as detected at step 1628, a build Vt_Message is sent to the transport layer, step 1630, in order to communicate with any client(s). If there are more Vt_Packets in the message, as detected at step 1628, then the process continues at step 1614.

The operation of the transport layer is illustrated in FIG. 16c. Message(s) are received at the transport layer from the network layer at step 1602. First, it is determined whether it is a Vt_Status message at step 1604. If so, then it is determined whether any of the channels are being closed by the status message at step 1606. If so, then the local status cache of the channel is rebuilt, rebuilding the channel map, at step 1608, and a ChannelClosed message is sent to all local client applications at step 1610. The process then proceeds to step 1612, which is also performed if the message was not a status message. At step 1612, the Vt_Message is then transmitted to the application(s) listening to the message's channel.

Figure 17:
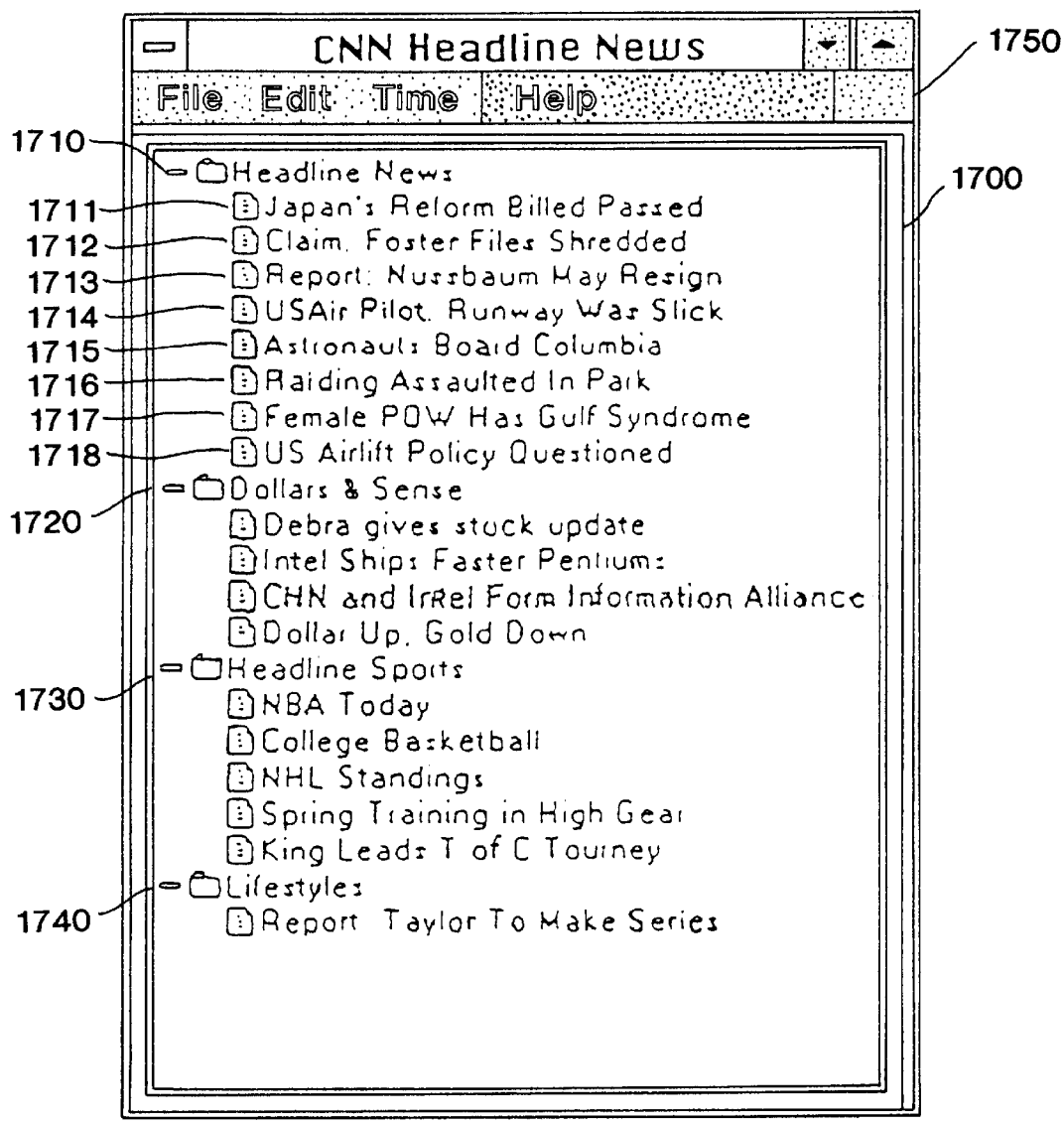
FIG. 17 shows an example user interface window which main be used by a client application program of a decoder, or an authoring client application program at the transmitter.

An example of a program information window, as may be displayed on the display of a suitably programmed microcomputer (e.g. 310 of FIG. 3) or other apparatus having similar function executing a program information client application is shown as 1700 of FIG. 17. Such a program information window may be displayed using any number of commercially-available graphical user interfaces (GUI) such as the Windows brand GUI available from Microsoft Corporation of Redmond, Wash. As illustrated, the program information window may display program information in outline form, as derived from a packet such as the program marker packet 1200, as described with reference to FIG. 12, above. In this news application window 1700, the program title is displayed as the window title, and segment titles are show as 1710, 1720, 1730 and 1740. Story headings, such as 1711–1718, as discussed above, are referenced in order of appearance under the headline. Using this type of display, using any of the pull-down menu options 1750, other options may be accessed, such as real-time stock quotes, sports scores, or other non-program information. Selection of any of the headlines 1711–1718 may allow display of text of the story, closed captioned information, and/or other program-related information, such as events, captions, sidebars, or other useful information.

Figure 18:
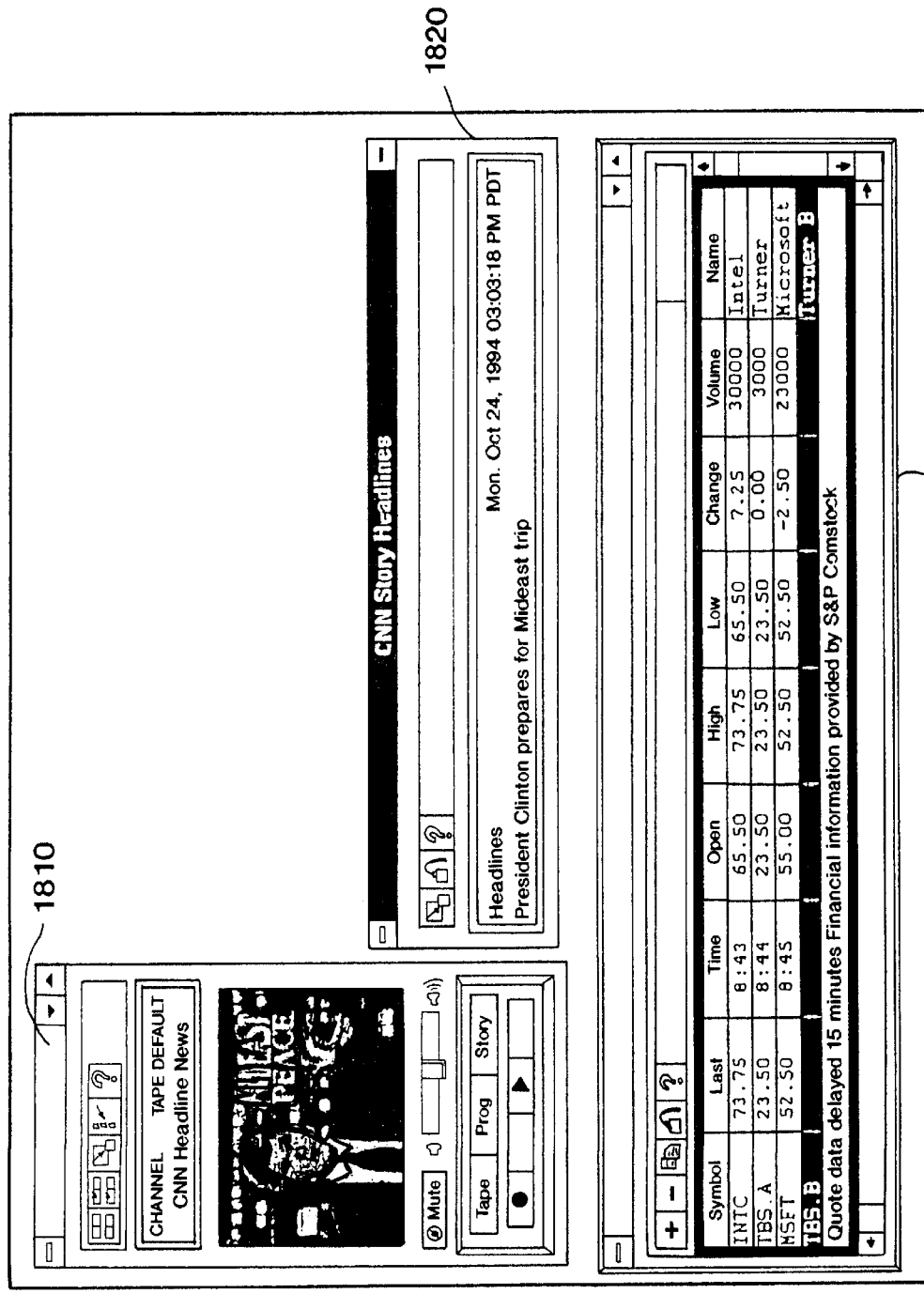
FIG. 18 shows an example of a user display displaying the audio/video program, the program information and non-program information which may be displayed by separate client applications.

Another example of a display during a user-session at the decoder is shown in FIG. 18. Window 1810 presents the televised audio/video program, which may be executed under control of a first task in a multitasking environment, and may be fed by any number of sources (e.g. satellite, broadcast, cable, or digital transmission). A second task, a client of the VIP decoder (e.g. 500 of FIG. 5), may display program-related information in a window such as 1820, such as headlines for news stories. Any other transmitted program information may be accessed using this window under control of the program client. Finally, non-program information, such as real-time stock quotations, may be displayed in window 1830 under control of a third task, also a client of the decoder. In this way, program and non-program information may be displayed to the user, depending upon which information he considers of interest, and which client application(s) are activated.

Using the above-described methods, apparatus, packets and protocols, client application programs can communicate with a main decoder process (e.g. 500 of FIG. 5) and obtain useful, multiplexed serialized data which is received along with transmitted audio/video information, and extract certain useful information according to requirements. The post-processing, including the display of user-interfaces, control of additional device(s) (e.g. video digitizers or video recorders), or other responsive actions in the clients as s result of the reception of such information may be performed according to implementation. The transmission or reception of such information does not interfere with the audio/video programming transmitted concurrently therewith, and also, takes advantage of the unused bandwidth provided by such transmissions. Thus, implemented embodiments of the present invention present advantages neither recognized nor realized by the prior art.

Thus, method and apparatus for transmission of information along with audio/video programming has been described. Note that though the foregoing has particular utility in these systems, and although it has been described with reference to certain specific embodiments in the figures and the text, that one may practice the present invention without utilizing all of these specific details. Thus, the figures and the text are to be viewed an illustrative sense only, and not limit the present invention. The present invention is only to be limited by the appended claims which follow.

What is claimed is:

1. A method for transmitting information with a video signal, the method comprising the steps of:

creating a message to be transmitted to a receiver by a first client application of a plurality of client applications, said message includes an identifier which identifies a type of said message and enables prioritization of data contained in said message;

transmitting said message to a data encoder;

receiving said message and other messages from other client applications;

converting said message and said other messages into packets and multiplexing said packets into a bitstream to be encoded with a video programming signal, said multiplexing being performed according to priorities specified by said identifier contained in said message and other identifiers contained in said other messages; and sending said bitstream to a video encoder to encode said bitstream with said video programming signal.

2. The method of claim 1 wherein each of said plurality of client applications includes a status application which transmits said message containing status information at regular intervals and synchronized with said video signal.

3. The method of claim 1 wherein each of said plurality of client applications includes a program application which transmits descriptive information of said video programming synchronized with said video signal.

4. The method of claim 1 wherein each of said plurality of client applications includes a non-program application.

5. The method of claim 1 wherein each of said plurality of client applications includes a status application which transmits said message containing status information at regular intervals, a program application which transmits descriptive information of said video programming synchronized with said video signal, and a non-program application, wherein said status application has a highest of said priorities, said program application has a next highest of said priorities, and said non-programming signal has a lowest of said priorities.

6. The method of claim 3 wherein said descriptive information of said video programming includes one of (i) an indication of an event in said programming, (ii) an indication of a video image which should be stored for reference, (iii) a plurality of captions, (iv) a plurality of sidebars, and (v) text in outline form describing said video programming.

7. The method of claim 6 wherein said event includes one of a momentary type of action, a transition, a camera switch, an editing command, and a zoom.

8. The method of claim 6 wherein said sidebars include references to related data.

9. The method of claim 8 wherein said references to related data include a uniform resource locator (URL).

10. The method of claim 8 wherein said references to related data include an OLE (Object Linking and Embedding) link.

11. The method of claim 6 wherein said text in outline form describing said video programming includes headings and subheadings describing said video programming.

12. The method of claim 6 wherein said text in outline form describing said video programming includes headings and subheadings describing segments of said video programming.

13. The method of claim 2 wherein said status information transmitted at regular intervals includes a channel map identifying the packets generated by said client application and said other client applications.

14. The method of claim 13 wherein said status information transmitted at regular intervals includes a source identifier, and a current time reference.

15. The method of claim 1 wherein said first client application and said second client application are the same.

16. The method of claim 1 wherein said bitstream is transmitted by satellite, television live broadcasting, or computer network communication.

17. The method of claim 1 further comprises a step of reconverting said bitstream into a plurality of messages to be sent to a second client application of said plurality of client applications.

18. A method for transmitting data along with a video programming signal corresponding to a video program, the method comprising the steps of:
receiving at least one message, the at least one message including at least one identifier to identify a type of the message and to establish a priority level;
converting the at least one message into a plurality of frames, each frame including at least one packet;
multiplexing the plurality of frames in order to produce a data stream, said multiplexing being performed according to the priority levels associated with the at least one message; and
encoding the data stream to the video programming signal which is synchronized to the video program.

19. The method of claim 18 wherein the step of receiving the at least one message is performed by a video indexing protocol (VIP) encoder.

20. The method of claim 19 further comprising the step of transmitting the video programming signal through a communication medium to a VIP decoder.

21. The method of claim 20, wherein the communication medium includes one of a digital transmission, a broadcast, a cablecast and a satellite uplink.

22. The method of claim 18, wherein the converting step includes the steps of:
converting the at least one message messages into at least one packet; and
converting each packet into one of the plurality of frames.

23. The method of claim 18, wherein prior to the receiving step, the method includes the steps of:

receiving an information bit stream by each of a plurality of encoders;
encoding at least each information bit stream in accordance with an encoding function of a corresponding encoder to produce the at least one message; and
transmitting the at least one message to the VIP encoder.

24. The method of claim 23, wherein the encoding step further includes the step of:
encoding status information including at least one of a time code, a station identification and a channel map.

25. The method of claim 23, wherein the encoding step further includes the step of:
encoding program information including a program marker.

26. The method of claim 25, wherein the program marker is one of a program identification (ID), a story ID, a segment ID, a section ID, and a commercial ID.

27. The method of claim 20, wherein at least one of said plurality of frames includes a status packet transmitted at a predetermined time interval to synchronize the VIP encoder with the VIP decoder.

28. The method of claim 18, wherein at least one of said plurality of frames includes a program packet.

29. The method of claim 28, wherein said program packet is one of an event, a video image format, a caption, and a sidebar.

30. The method of claim 18, wherein at least one of the plurality of frames includes a non-program packet.

31. The method of claim 30, wherein the non-program packet includes at least one of a stock quotation, sports score, and weather information.

32. A method for transmitting data along with a video programming signal corresponding to a video program, the method comprising the steps of:
receiving at least one message, the at least one message including at least one identifier to identify a type of the message and to establish a priority level;
converting the at least one message into a plurality of frames, each frame including at least one packet;
multiplexing the plurality of frames in order to produce a data stream, said multiplexing being performed according to the priority levels associated with the at least one message; and
encoding the data stream to a vertical blanking interval of the video programming signal.

33. The method of claim 32 wherein the step of receiving the at least one message is performed by a video indexing protocol (VIP) encoder.

34. The method of claim 33 further comprising the step of transmitting the video programming signal through a communication medium to a VIP decoder.

35. The method of claim 34, wherein the communication medium includes one of a digital transmission, a broadcast, a cablecast and a satellite uplink.

36. An encoding system comprising:
a communication link;
at least one computer system coupled to the communication link, the at least one computer system running a client application to generate a message;
a master encoder coupled to the communication link, the master encoder (i) receiving at least one message from the at least one computer system, the at least one message including an identifier to identify a message type and to establish a priority level, (ii) converting the at least one message into a plurality of frames, each frame including at least one packet, and (iii) multiplexing the plurality of frames in accordance to the priority levels specified by the identifiers contained in the at least one message to produce a data stream; and a video encoder coupled to the master encoder, the video encoder encoding the data stream into a video programming signal.

37. The encoding system of claim 36, wherein the video programming signal is synchronized with a real-time video program.

38. The encoding system of claim 37, wherein said real-time video program is transmitted by one of a digital transmission, a broadcast, a cablecast, and a satellite uplink.

39. The encoding system of claim 36, wherein the video encoder is a vertical blanking interval (VBI) inserter.

40. The encoding system of claim 39, wherein the data stream is encoded into the vertical blanking interval of the video programming signal.

41. A decoding system comprising:

a video decoder to receive a video programming signal corresponding to a video program and to extract encoded information contained in the video programming signal, the encoded information corresponding to a bit stream formed by multiplexing a plurality of frames in accordance to priority levels specified by identifiers contained in at least one message, each of the identifiers identifying a message type and establishing a priority level, the plurality of frames being converted from the at least one message, each frame including at least one packet;

a communication link;

at least one computer system coupled to the communication link; and a decoder coupled to the communication link and the video decoder, the decoder receiving the encoded information and separating the at least one message in the encoded information according to the specified priorities into at least one channel readable by the at least one computer system.

42. The decoding system of claim 41, wherein the video programming signal is synchronized with a real-time video program.

43. The decoding system of claim 42, wherein said real-time video program is transmitted by a digital transmission, a broadcast, a cablecast, and a satellite uplink.

44. The decoding system of claim 41, wherein the video decoder is a vertical blanking interval (VBI) decoder.

* * * * *